US012761744B2

(12) United States Patent
Quan et al.

(10) Patent No.: US 12,761,744 B2
(45) Date of Patent: Oct. 13, 2026

(54) METHOD FOR USING STYLUS FOR PRESENTATION CONTROL AND STYLUS

(71) Applicant: Honor Device Co., Ltd., Shenzhen (CN)

(72) Inventors: Ruilin Quan, Shenzhen (CN); Long Wang, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/701,838

(22) PCT Filed: Apr. 13, 2023

(86) PCT No.: PCT/CN2023/088170
§ 371 (c)(1),
(2) Date: Apr. 16, 2024

(87) PCT Pub. No.: WO2024/001424
PCT Pub. Date: Jan. 4, 2024

(65) Prior Publication Data
US 2025/0224822 A1 Jul. 10, 2025

(30) Foreign Application Priority Data
Jun. 28, 2022 (CN) ......................... 202210753924.3

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/0483* (2013.01); *G06F 3/0488* (2013.01)

(58) Field of Classification Search
CPC .. G06F 3/0383; G06F 3/03545; G06F 3/0483; G06F 3/0488; G06F 3/038;
(Continued)

(56) References Cited

U.S. PATENT DOCUMENTS 11,703,960 B2 7/2023 Wu et al.
2005/0206627 A1 9/2005 Simmons
(Continued)

FOREIGN PATENT DOCUMENTS

CN 201576368 U 9/2010
CN 102243542 A 11/2011
(Continued)

OTHER PUBLICATIONS

"Samsung Galaxy Note 20"; Baidu Encyclopedia; Feb. 22, 2022; https://baike.baidu.com/item/Samsung%20Galaxy%20Note%2020/60153997?fr=ge_ala.
(Continued)

*Primary Examiner* — Temesghen Ghebretinsae
*Assistant Examiner* — Ivelisse Martinez Quiles
(74) *Attorney, Agent, or Firm* — Conley Rose, P.C.

(57) ABSTRACT

A method for presentation control, a system, and an electronic device. After the electronic device enables a function of a cursor being controlled by a stylus, the electronic device can be controlled by the stylus to display the cursor and move the cursor.

20 Claims, 28 Drawing Sheets

(51) Int. Cl.
*G06F 3/0483* (2013.01)
*G06F 3/0488* (2022.01)

(58) Field of Classification Search
CPC ....... G06F 3/04892; G06F 2203/04101; G06F 2203/04108; G06F 3/04162; G06F 2203/0384; G06F 3/0346; G06F 3/0354; G06F 3/04812
See application file for complete search history.

(56) References Cited

U.S. PATENT DOCUMENTS

| | | | | |
|---|---|---|---|---|
| 2013/0207937 | A1 | 8/2013 | Lutian et al. | |
| 2014/0146021 | A1 | 5/2014 | Trethewey et al. | |
| 2016/0139690 | A1 | 5/2016 | Chang | |
| 2018/0032154 | A1 | 2/2018 | Yao et al. | |
| 2019/0064947 | A1* | 2/2019 | Saito | G06F 3/03545 |
| 2022/0187930 | A1* | 6/2022 | Kang | G06F 3/02 |
| 2023/0221814 | A1* | 7/2023 | Kwon | G06F 3/0383 345/179 |
| 2024/0411390 | A1* | 12/2024 | Zhang | G06F 3/0383 |

FOREIGN PATENT DOCUMENTS

| | | | |
|---|---|---|---|
| CN | 108093285 | A | 5/2018 |
| CN | 208848177 | U | 5/2019 |
| CN | 110297550 | A | 10/2019 |
| CN | 110347269 | A | 10/2019 |
| CN | 110716669 | A | 1/2020 |
| CN | 112947773 | A | 6/2021 |
| CN | 114035721 | A | 2/2022 |
| KR | 101835264 | B1 | 3/2018 |

OTHER PUBLICATIONS

"Samsung Galaxy Note20 (8GB/256GB/5G version) interpretation"; Tianji.com; Feb. 22, 2022; https://wap.yesky.com/product/product/1090/1090293/jiedu.shtml?use_xbridge3=true&loader_name=forest&need_sec_link=1&sec_link_scene=im.

* cited by examiner (a) (b)

METHOD FOR USING STYLUS FOR PRESENTATION CONTROL AND STYLUS

CROSS-REFERENCE TO RELATED APPLICATIONS

This is a U.S. National Stage of International Application No. PCT/CN2023/088170 filed on Apr. 13, 2023, which claims priority to Chinese Patent Application No. 202210753924.3, filed with the China National Intellectual Property Administration on Jun. 28, 2022, both of which are incorporated herein by reference in their entireties.

TECHNICAL FIELD

This application relates to the field of terminal technologies, and in particular, to a method for using a stylus for presentation control and a stylus.

BACKGROUND

Equipping an electronic device with a stylus can improve use experience of the electronic device. For example, the electronic device is a tablet. The tablet is equipped with the stylus, and the stylus can be configured to complete operations such as drawing and note-taking on the tablet with stronger flexibility.

However, existing styluses can complete interaction only by touching a screen of the electronic device and are not suitable for a presentation scenario. For example, in a working conference, a presentation in the tablet needs to be shown to others. In this scenario, it is often not possible to use the stylus to flexibly control the tablet to complete presentation.

SUMMARY

In view of this, this application provides a method for using a stylus for presentation control and a stylus. The stylus can be used in a presentation scenario, to control an electronic device such as a tablet or a notebook to complete a presentation operation. Therefore, an adaptation scenario of the stylus is improved.

According to a first aspect, an embodiment of this application provides a method for using a stylus for presentation control, applicable to a stylus. The stylus establishes a wireless communication link such as a Bluetooth link or a wifi link with a first device, where the wireless communication link may be configured to transmit a command of presentation control, for example, a first command. In a case that the stylus works in a handwriting mode, the stylus receives a first signal sent by the first device. The stylus sends a second signal in response to the first signal, where the first signal and the second signal are not sent through the wireless communication link. The second signal may be used for indicating position information of a touch operation performed by the stylus on the first device. Therefore, the first device conveniently responds to the touch operation. However, in the handwriting mode, the stylus does not respond to a first operation of a user, where the first operation is used for triggering the first device to perform a presentation operation of displaying a cursor. That is, in the handwriting mode, the stylus can perform only the touch operation on a screen of the first device and cannot implement presentation control on the first device.

In this embodiment of this application, a first event may trigger the stylus to switch an operating mode from the handwriting mode to a presentation mode. After the first event, the stylus sends the first command to the first device through the wireless communication link in response to the first operation, to control the first device to display a cursor within a time period between a first moment and a second moment, where execution of the first operation starts at a third moment and ends at a fourth moment, the third moment is earlier than the first moment, and the fourth moment is earlier than the second moment; and after the second moment, the first device does not display the cursor. That is, in the presentation mode, after detecting the first operation of the user, the stylus may control the first device to display the cursor within a period of time, so that the cursor can be displayed in a targeted manner. In addition, an end moment of displaying the cursor is later than an end moment of the first operation, so that after the cursor points to target content (for example, a web page link), it can be convenient to leave time for the stylus to control, based on an operation of the user, the first device to perform a presentation operation such as tapping or marking on the target content. However, after the first event, the stylus does not respond to the first signal. That is, in the presentation mode, the stylus does not continue to send related information of the touch operation to the first device, so that the first device cannot respond to the touch operation.

It should be noted that a transmission distance of the second signal is less than a transmission distance of the first command. Therefore, in the presentation mode, the stylus may control the first device at a relatively long distance from the first device. In the handwriting mode, the stylus can send the second signal to the first device only when being close to the first device.

Based on the foregoing, by using the method in this embodiment of this application, the stylus can implement different interaction with the first device in the two operating modes of the handwriting mode and the presentation mode. Therefore, the touch operation can be implemented, and presentation control on the first device can also be implemented, to control the first device to display the cursor more reasonably.

In a possible design manner, the sending, by the stylus after a first event, a first command to the first device through the wireless communication link in response to the first operation includes: in a case that an orientation of a tip of the stylus is a first orientation (for example, downward), after the stylus detects a switching operation performed by the user on the stylus, sending, by the stylus, the first command to the first device through the wireless communication link in response to the first operation. The switching operation is used for switching the operating mode of the stylus.

That is, by using the method in this embodiment, only after a tip of the stylus is toward a specific orientation and the switching operation of the user is detected, the stylus can implement presentation control on the first device. That is, the first event includes that the tip of the stylus faces upward and the switching operation performed by the user on the stylus is detected. Therefore, the stylus can be switched to the presentation mode more accurately, avoiding switching to the presentation mode in a case that the user wrongly performs the switching operation.

The switching operation may be a gesture of tap, multi-tap, long press, sliding, and the like on a non-key region of the stylus, or may be an operation of tap, double tap, long press, or the like on a key. The key may be a physical key or a virtual key. This is not specifically limited in this embodiment of this application.

In a possible design manner, the sending, by the stylus after a first event, a first command to the first device through the wireless communication link in response to the first operation includes: after the stylus detects a long press operation (which may be understood a switching operation) performed by the user on a key of the stylus and a moving trajectory of a tip of the stylus meets a preset trajectory condition within a time period over which the long press operation is performed, sending, by the stylus, the first command to the first device through the wireless communication link in response to the first operation.

That is, by using the method in this embodiment, after detecting the long press operation performed by the user on the key of the stylus and detecting that the moving trajectory of the tip meets the preset trajectory condition during the long press operation, the stylus can implement presentation control on the first device. That is, the first event includes that the long press operation on the key is detected and a displacement of a preset trajectory is detected. Therefore, the stylus can also be switched to the presentation mode more accurately, avoiding switching to the presentation mode in a case that the user wrongly performs the long press operation.

To further switch to the presentation mode more accurately, after detecting a switching operation performed by the user on a preset region (for example, a front end, a middle end, or a rear end) on a body of the stylus, the stylus can implement presentation control on the first device In a possible design manner, the sending, by the stylus after a first event, a first command to the first device through the wireless communication link in response to the first operation includes: playing, by the stylus, prompt voice and/or vibrating in response to the switching operation of the user, to prompt the user to confirm that the presentation mode is switched to; and after the stylus detects a second operation of the user, sending, by the stylus, the first command to the first device through the wireless communication link in response to the first operation. The second operation is used for indicating the user to confirm that the presentation mode is switched to. For example, the second operation may be a double tap operation, a long press operation, or the like.

That is, by using the method in this embodiment, after detecting the switching operation, the stylus further needs to prompt the user to confirm that the presentation mode is switched to, and the stylus can implement presentation control on the first device only after the user confirms that the presentation mode is switched to. That is, the first event includes that the switching operation is detected, the user is prompted to confirm that the presentation mode is switched to, and a confirmation operation of the user is detected. Therefore, switching of the operating mode can strictly match a requirement of the user.

In a possible design manner, the sending, by the stylus after a first event, a first command to the first device through the wireless communication link in response to the first operation includes: sending, by the stylus, a first notification to the first device in response to the switching operation of the user. The first notification is used for notifying a second device to prompt the user to confirm that the presentation mode is switched to. In response to receiving the first notification, the second device may display first prompt information in a pop-up window, broadcast first prompt information through voice, and/or vibrate, to prompt the user to confirm enabling of the presentation mode. For example, the first prompt information includes "tap to enable the presentation mode", to prompt to confirm enabling of the presentation mode. After detecting the confirmation operation, for example, a tap operation on a confirmation button in the first prompt information, the first device may send a first message to the stylus, where the first message is used for indicating the user to confirm that the presentation mode is switched to. After the stylus receives the first message from the first device, the stylus sends the first command to the first device through the wireless communication link in response to the first operation.

That is, by using the method in this embodiment, after detecting the switching operation, the stylus further needs to notify the first device to prompt the user to confirm that the presentation mode is switched, and the stylus can implement presentation control on the first device only after the user confirms that the presentation mode is switched to. That is, the first event includes that the switching operation is detected, the first device is notified to prompt the user to confirm that the presentation mode is switched to, and the first message indicating the user to confirm that the presentation mode is switched to is received. Therefore, switching of the operating mode can strictly match a requirement of the user.

In a possible design manner, after the establishing a wireless communication link between the stylus and a first device, the method further includes: receiving, by the stylus, a second message from the first device, where the second message is sent by the first device based on an operation of switching a stylus mode of the user. The second message is used for indicating the stylus to switch to the presentation mode. The first event includes that the stylus receives the second message.

In a possible design manner, after the first event, the method further includes: sending, by the stylus, a second command to the first device through the wireless communication link in response to a third operation, to control the first device to change a display position of the cursor, where the third operation is performed within a time period between the third moment and the fourth moment.

That is, in this embodiment, on the basis of controlling the first device to display the cursor within a partial time period, the stylus may further control the first device to move the cursor, so that the cursor indicates target content displayed by the first device, and the first device performs an operation such as tapping or marking on the target content.

In a possible design manner, after the first event, the method further includes: sending, by the stylus after a second event, the second signal in response to the first signal, where the stylus does not respond to the first operation.

That is, by using the method in this embodiment, the stylus may switch the operating mode of the stylus from the presentation mode back to the handwriting mode in response to the second event. Therefore, the operating mode can be flexibly switched.

According to a second aspect, an embodiment of this application provides a method for a stylus for presentation control, applicable to a stylus. The stylus establishes a wireless communication link with a first device. The stylus receives a first signal sent by the first device, and the stylus sends a second signal in response to the first signal, where the stylus does not respond to an air mouse operation of a user, and the first signal and the second signal are not sent through the wireless communication link. After a first event, the stylus sends a control command to the first device through the wireless communication link in response to the air mouse operation, to control the first device to implement a function of invoking a cursor, moving the cursor, tapping, and page flipping. The air mouse operation may include the first operation and the third operation in the first aspect. Correspondingly, the control command may include the first command and the second command. The air mouse operation may further include a fourth gesture and a twelfth operation in this embodiment for triggering the stylus to control the first device to implement the function of tapping. The air mouse operation may further include an upward sliding gesture and a downward sliding gesture, or a thirteenth operation and a fourteenth operation for triggering the stylus to control the first device to implement the function of page flipping. That is, after being switched to the presentation mode, the stylus may control the first device to perform various presentation operations. However, after the first event, the stylus does not respond to the first signal. A transmission distance of the second signal is less than a transmission distance of the control command.

According to a third aspect, an embodiment of this application further provides a stylus, including: a memory and one or more processors, where the memory is coupled to the processor; and the memory stores computer program code, the computer program code includes computer instructions, and the computer instructions, when executed by the processor, cause the stylus to perform the methods according to the first aspect, the second aspect, and any one of the possible design manners thereof.

According to a fourth aspect, an embodiment of this application further provides a computer-readable storage medium including computer instructions, where when the computer instructions run on a stylus, the stylus is enabled to perform the methods according to the first aspect, the second aspect, and any one of the possible design manners thereof.

According to a fifth aspect, an embodiment of this application further provides a chip system. The chip system is used in a stylus including a processor and a memory, the chip system includes one or more interface circuits and one or more processors, the interface circuit and the processor are interconnected through a line, the interface circuit is configured to receive a signal from the memory of the stylus and send the signal to the processor, where the signal includes computer instructions stored in the memory, and when the processor executes the computer instructions, the stylus is enabled to perform the methods according to the first aspect, the second aspect, and any one of the possible design manners thereof.

According to a sixth aspect, this application provides a computer program product, and when the computer program product runs on a computer, the computer is enabled to perform the methods according to the first aspect, the second aspect, and any one of the possible design manners thereof.

It may be understood that, for the beneficial effects that can be achieved by the stylus according to the third aspect, the computer-readable storage medium according to the fourth aspect, the chip system according to the fifth aspect, and the computer program product according to the sixth aspect, reference may be made to the beneficial effects in the first aspect, the second aspect, and any one of the possible design manners thereof.

DESCRIPTION OF EMBODIMENTS

Figure 1A:
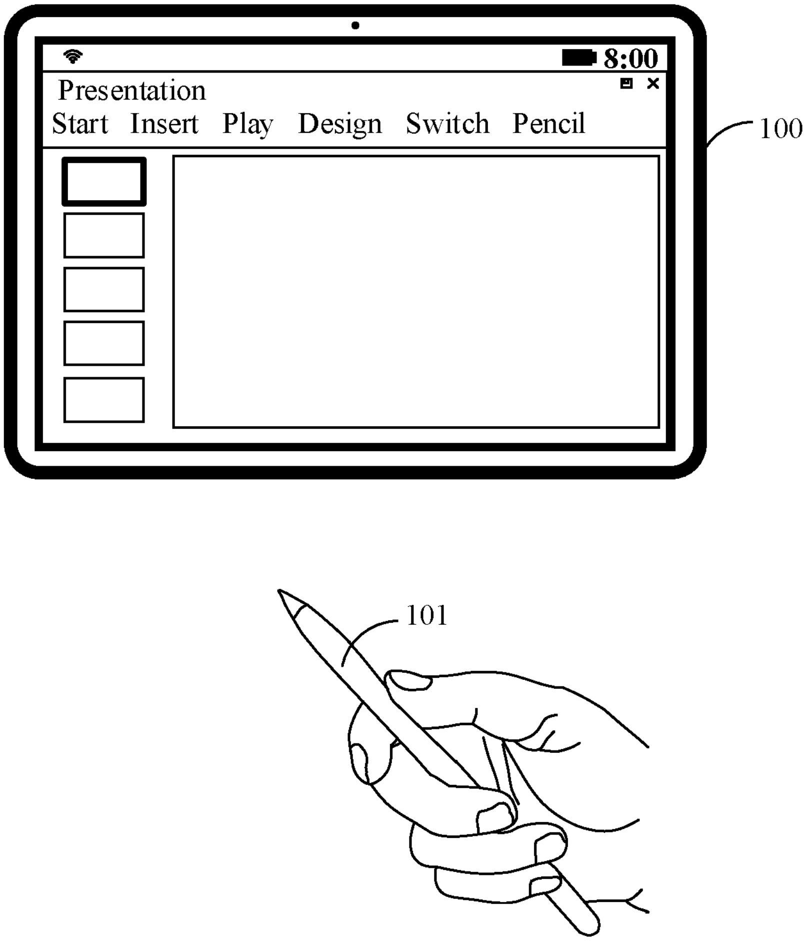
FIG. 1A is a first schematic diagram of a presentation scenario according to an embodiment of this application.

During daily work and learning, it may be necessary to use a laser pen to control content in devices such as a notebook and a tablet to present the content to others. In addition, an existing stylus can only be generally in contact with the devices such as the notebook and the tablet to implement interaction and cannot used as the laser pen and used in a presentation scenario.

Based on the technical problem, an embodiment of this application provides a method for using a stylus for presentation control, which is applicable to a presentation system provided in this embodiment of this application. The presentation system includes a first device and a stylus. The first device in the presentation system is configured to provide content that needs to be presented to others (which may be referred to as presentation content). For example, presentation is performed on a tablet, and the tablet is the first device. Alternatively, presentation is performed on a notebook, and the notebook is the first device. In addition, the stylus in the presentation system is configured to control the first device to perform a presentation operation on the presentation content, for example, control the first device to indicate and tap target content in the presentation content or control the first device to perform a page flipping operation. The stylus may be a touch stylus matching the second device such as a mobile phone or a tablet.

For example, a wireless connection may be established between the first device and the stylus through a near field communication technology such as Bluetooth, wireless fidelity (wireless fidelity, Wi-Fi), or near field communication (Near Field Communication, NFC). In this embodiment of this application, the wireless connection is established between the first device and the stylus, so that a control instruction of the stylus can be sent to the first device, to implement presentation control on the presentation content in the first device.

The first device may be a device that supports presentation, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR) \virtual reality (virtual reality, VR) device.

The presentation content in the first device may be a presentation (for example, PPT), a text document (for example, word), a video, or the like. This is not specifically limited in this embodiment of this application. The solution in this application is described below by using an example in which the presentation content is the presentation.

Several presentation scenarios to which this embodiment of this application is applicable and a presentation system in a corresponding presentation scenario are listed below by using an example in which a second device is a tablet 100 in FIG. 1A to FIG. 1C and the stylus is a stylus 101 matching the tablet 100 in FIG. 1A to FIG. 1C.

Referring to FIG. 1A, in some scenarios (which may be denoted as a scenario 1), for example, in group discussion during work or learning, presentation is required in the tablet 100. In the scenario 1, both a first device and the second device are the same device and are the tablet 100, and the stylus 101 matching the tablet 100 may be configured to control the tablet 100 to complete a presentation operation.

Figure 1B:
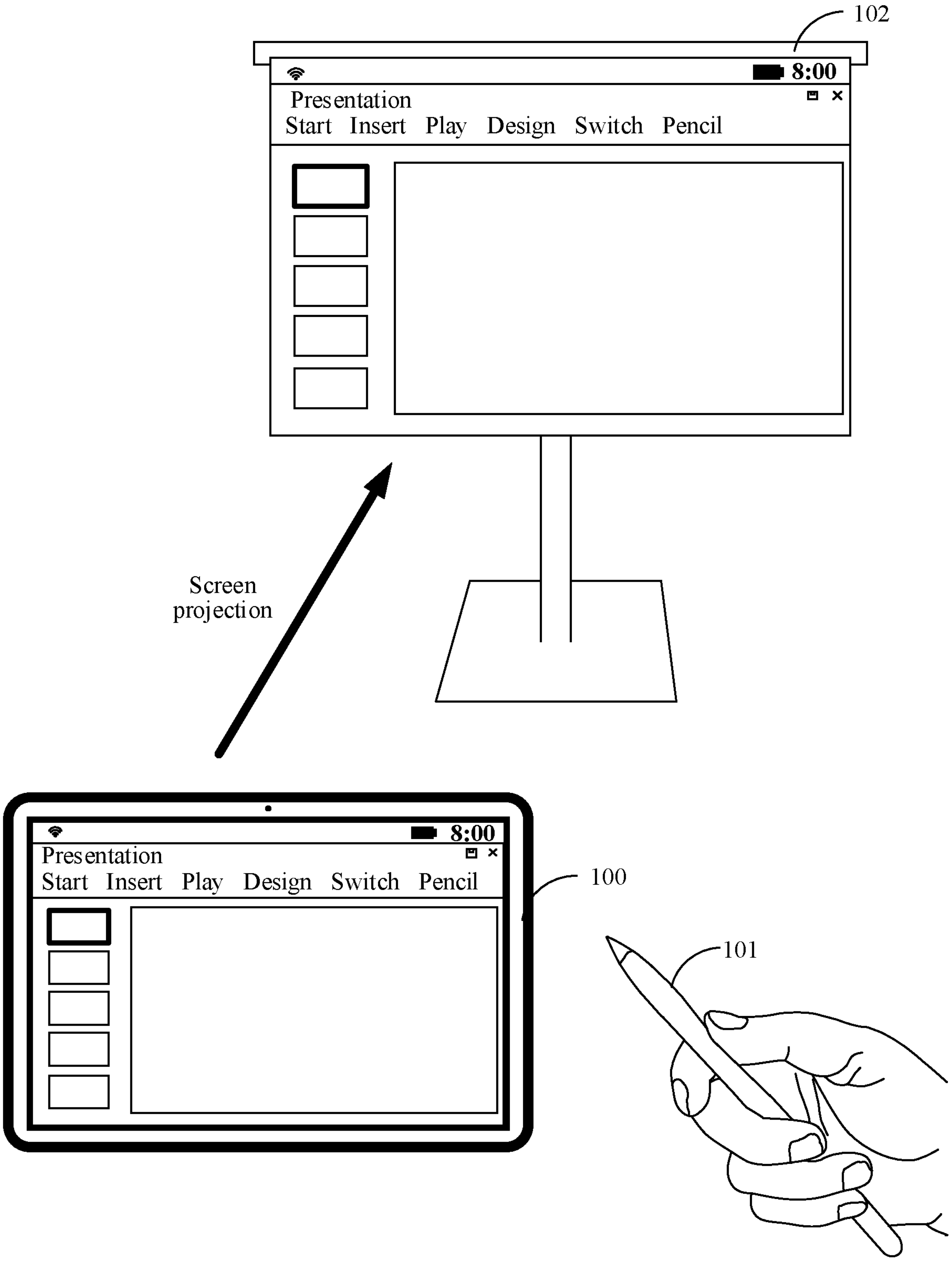
FIG. 1B is a second schematic diagram of a presentation scenario according to an embodiment of this application.

Referring to FIG. 1B, in some scenarios (which may be denoted as a scenario 2), for example, in a working conference, presentation content in the tablet 100 needs to be projected to a projector 102 for presentation. It should be noted that when presentation content in a device such as a tablet or a notebook is projected to a screen-projected device (for example, the projector 102) for presentation, the screen-projected device (for example, the projector 102) is only configured for display, and the device such as the tablet or the notebook really provides the presentation content. Therefore, during screen projection and presentation, the first device is not the screen-projected device (for example, the projector 102) but the device (for example, the tablet 100) such as the tablet or the notebook that projects the presentation content to the screen-projected device (for example, the projector 102). That is, in the scenario 2, both the first device and the second device are the same device and are the tablet 100, and the stylus 101 matching the tablet 100 may be configured to control the tablet 100 to complete a presentation operation.

In some scenarios (which may be denoted as a scenario 3), for example, in a remote desktop conference, content displayed in a desktop of a tablet needs to be shared to a remotely connected device. In addition, during desktop sharing, if a presentation is played in full screen of the desktop, a cursor may disappear. In this case, the stylus may be configured to control the tablet to complete a presentation operation, for example, indicating content in the presentation or page flipping. Therefore, when the presentation is played in full screen in the remote desktop conference, the presentation is flexibly operated and shared on another remotely connected device. In this scenario, both the first device and the second device are the same and are the tablet.

Figure 1C:
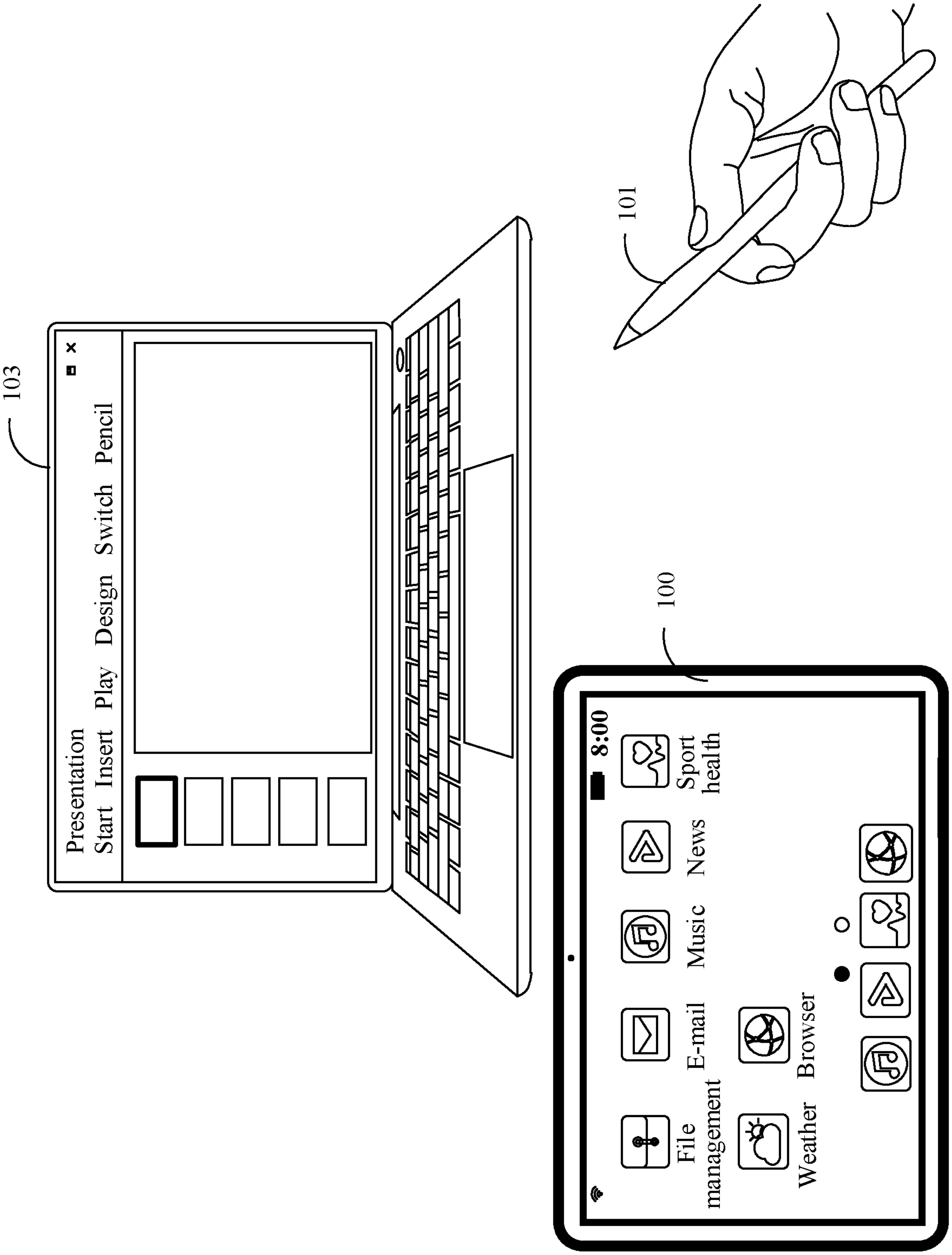
FIG. 1C is a third schematic diagram of a presentation scenario according to an embodiment of this application.

Referring to FIG. 1C, in some scenarios (which may be denoted as a scenario 4), presentation is required in a notebook 103. In the scenario 3, the first device is the notebook 103 and is different from the second device, that is, the tablet 100, and the stylus 101 matching the tablet 100 may be configured to control the notebook 103 to complete a presentation operation.

In the foregoing presentation scenarios (for example, the scenario 1, the scenario 2, the scenario 3, and the scenario 4), by using the method for using a stylus for presentation control provided in this embodiment of this application, the first device may receive a control instruction of the stylus, and the first device may perform a corresponding presentation operation on presentation content in response to the control instruction, for example, indicating and tapping target content in the presentation content or performing a page flipping operation. Therefore, the stylus may also be used as a laser pen for presentation control, to improve an adaption scenario of the stylus.

Figure 2A:
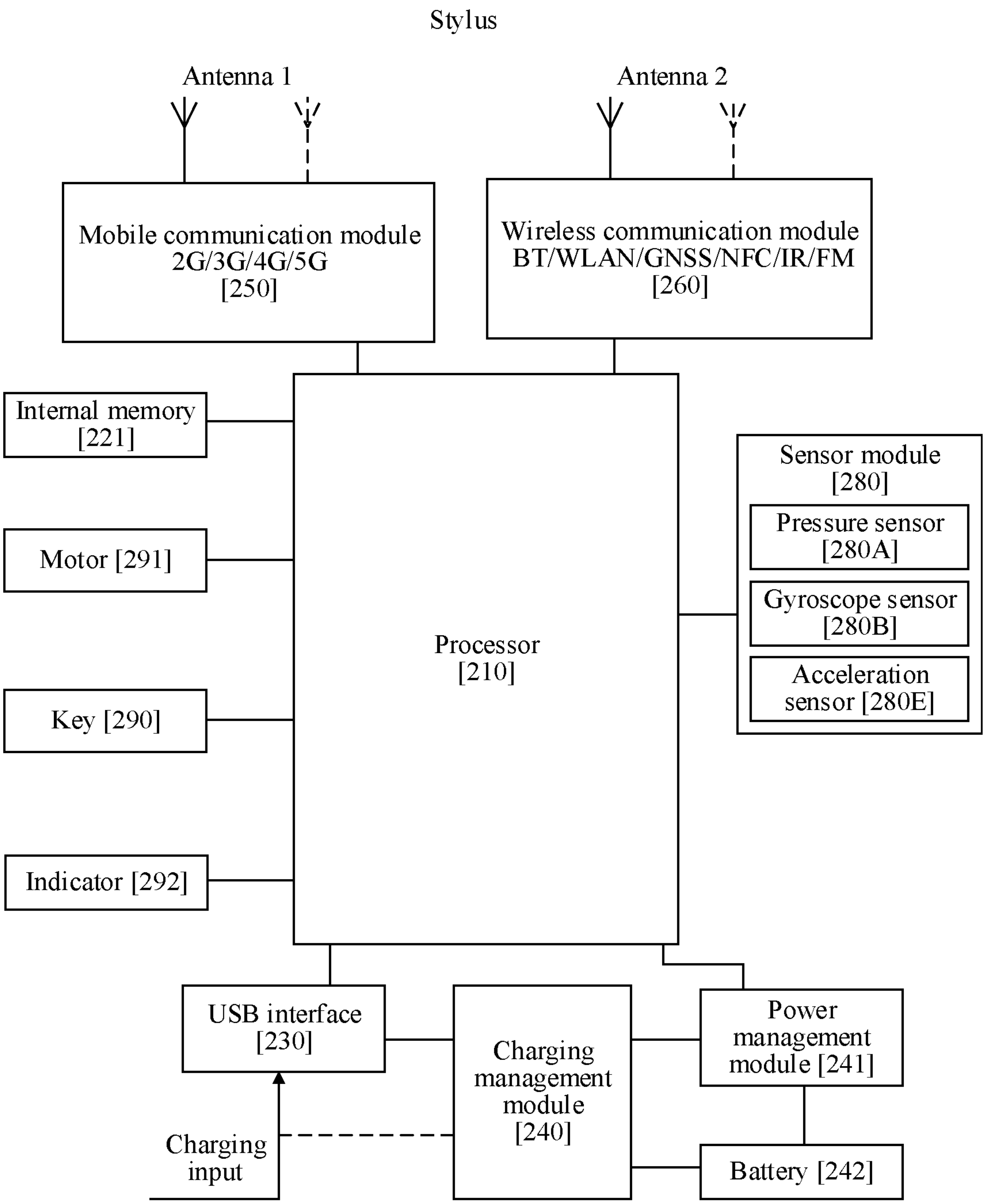
FIG. 2A is a schematic diagram of a hardware structure of a stylus according to an embodiment of this application.

FIG. 2A is a schematic diagram of a hardware structure of a stylus according to an embodiment of this application. As shown in FIG. 2A, the stylus may include a processor 210, an internal memory 221, a universal serial bus (universal serial bus, USB) interface 230, a charging management module 240, a power management module 241, a battery 242, an antenna 1, an antenna 2, a mobile communication module 250, a wireless communication module 260, a sensor module 280, a key 290, a motor 291, an indicator 292, and the like.

It may be understood that the structure illustrated in this embodiment does not constitute a specific limitation on the stylus. In some other embodiments, the stylus may include more or fewer components than those shown in the figure, or some components may be combined, or some components may be split, or components are arranged in different manners. The components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video encoder and decoder, a digital signal processor (digital signal processor, DSP), a baseband processor, and/or a neural-network processing unit (neural-network processing unit, NPU). Different processing units may be independent devices, or may be integrated into one or more processors.

A memory may be further provided in the processor 210 to store instructions and data. The memory in the processor 210 may be a cache memory. The memory may store an instruction or data that is just used or cyclically used by the processor 210. If the processor 210 needs to use the instruction or data again, the processor may directly invoke the instruction or data from the memory, which avoids repeated access and reduces a waiting time of the processor 210, thereby improving system efficiency.

In some embodiments, the processor 210 may recognize a gesture type according to gesture information such as touch duration, a quantity of touches, and a touch position of a gesture performed by a user on the stylus, where the gesture type may include a long press gesture, a single tap gesture, a double tap gesture, a three tap gesture, an upward sliding gesture, a downward sliding gesture, and the like. The processor 210 may further generate a corresponding control command according to the gesture type and/or the touch position, to control the first device to complete a corresponding presentation operation. For example, different gestures for the same touch region may correspond to different control commands. Alternatively, the same gesture for different touch regions may correspond to different touch commands.

Figure 2B:
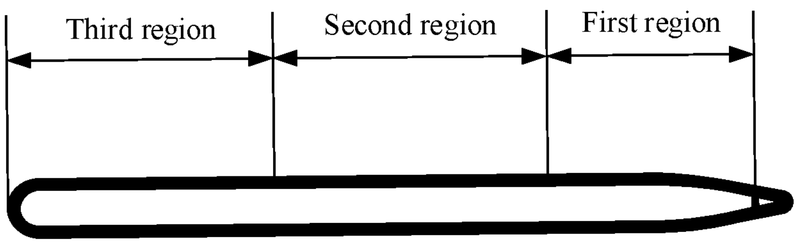
FIG. 2B is a schematic diagram of division of a touch region of a stylus according to an embodiment of this application.

Referring to FIG. 2B, in a specific implementation, the stylus may be divided into a total of three touch regions of a first region, a second region, and a third region from a front end to a tail end. Correspondingly, the processor 210 may determine a touch region to which the touch position belongs, and then generate a corresponding control command according to the touch region and the gesture type. For example, after determining a double tap gesture corresponding to the first region, the processor 210 may generate a page up control command, and after determining a double tap gesture corresponding to the third region, the processor 210 may generate a page down control command.

It should be understood that the touch region of the stylus shown in FIG. 2B is merely an example. During actual implementation, the stylus may be divided into more or fewer touch regions. This is not specifically limited in this embodiment of this application.

In some other embodiments, the processor 210 may recognize an operation type according to operation information such as press duration and a quantity of presses of an operation performed by the user on a key of the stylus, where the operation type includes a long press operation, a single tap operation, a double tap operation, a three tap operation, and the like. The processor 210 may further generate a corresponding control command according to the operation type and/or a key on which the operation is performed, to control the first device to complete a corresponding presentation operation. For example, different operations for the same key may correspond to different control commands. Alternatively, the same operation for different keys may correspond to different control commands.

It should be understood that an operation performed on the key of the stylus may be pressing on a single key or may be simultaneously or sequentially combined pressing on a plurality of keys. This is not specifically limited in this embodiment of this application. An example in which the operation is pressing on the single key is mainly used for description below.

So far, it should be noted that, in this specification, both the operation and the gesture on the stylus include long press, single tap, double tap, three tap, or the like. However, the operation is pressing on the key of the stylus, and the gesture is touch on a non-key region of the stylus. In addition, to improve accuracy of recognizing the gesture type and the operation type, a time threshold may be set to distinguish long press, single tap, double tap, or three tap. For example, if duration of once press or touch exceeds first preset duration (for example, 2000 ms), it may be recognized as long press, on the contrary, if the duration of once press or touch does not exceed the first preset duration (for example, 2000 ms), it may be recognized as tap. It should be understood that tapping may be pressing on the key or may be touch on the non-key region. For another example, when a plurality of continuous taps are performed, if interval duration between two adjacent taps does not exceed second preset duration (for example, 100 ms), the two taps may be recognized as the same operation or gesture. For example, if an interval between two continuous presses performed by the user on the key of the stylus does not exceed 100 ms, the two presses may be recognized as a double tap operation. For another example, if an interval between any two adjacent presses in three continuous presses performed by the user on the key of the stylus does not exceed 100 ms, the three presses may be recognized as three tap operation.

In some other embodiments, the processor 210 may calculate a displacement of a cursor in the first device according to a displacement generated by operating a tip of the stylus by the user, and generate a cursor movement control command, to control the first device to move the cursor.

In some other embodiments, the processor 210 may generate a corresponding control command according to an orientation of a tip of the stylus, to control the first device to complete a corresponding presentation operation.

Figure 2C:
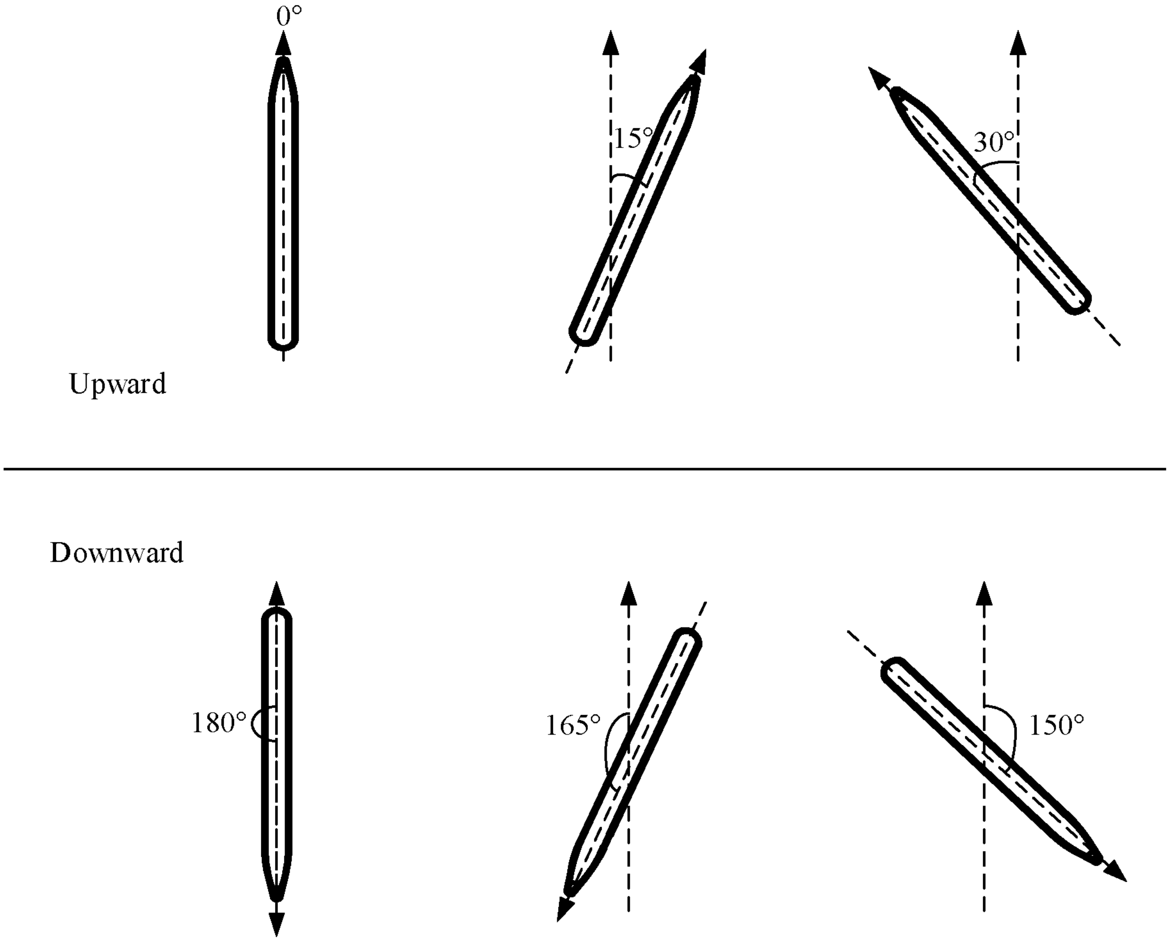
FIG. 2C is a schematic diagram of an orientation of a tip of a stylus according to an embodiment of this application.

In a specific implementation, the orientation of the tip of the stylus may be determined according to an angle α (which refers to an angle less than or equal to 180°) between a ray extending from a tail end of the stylus to a direction of the tip and an opposite direction of gravity (or a direction of gravity). Referring to FIG. 2C, the opposite direction of gravity is used as an example, and when $\alpha<\alpha0$, for example, 30° or 45°, it may be determined that the tip of the stylus faces upward. For example, when $\alpha0=45°$, that is, when $\alpha=0°$, 15°, or 30° in FIG. 2C, it may be determined that the tip of the stylus faces upward. When $\alpha>\alpha1$, for example, 135° or 150°, it may be determined that the tip of the stylus faces downward. For example, when $\alpha1=135°$, that is, when $\alpha=180°$, 165°, or 150° in FIG. 2C, it may be determined that the tip of the stylus faces downward.

A calculation processing process performed by the processor 210 is described above with respect to the gesture, the operation, the displacement of the tip of the stylus, and the orientation of the tip of the stylus respectively. In some other embodiments, the processor 210 may also combine a plurality of pieces of information of the gesture, the operation, the displacement of the tip of the stylus, and the orientation of the tip of the stylus, to obtain a corresponding control command. For example, on the basis of recognizing the gesture type or the operation type as a preset type 1 (for example, a long press type), the processor 210 may further generate the cursor movement control command according to the displacement generated by the tip of the stylus. That is, in a case that the gesture type or the operation type is the preset type 1 (for example, the long press type), the cursor movement control command is generated according to the displacement of the tip of the stylus. For another example, on the basis of recognizing the orientation of the tip of the stylus as a preset orientation (for example, upward), the processor 210 may further generate a corresponding control command according to the gesture type or the operation type.

In some embodiments, the processor 210 may further control the stylus to enable or exit a presentation mode according to one or more of the gesture, the operation, the displacement of the tip of the stylus, the orientation of the tip of the stylus, a command sent by the first device, and a command sent by the second device. When the stylus is in the presentation mode, the processor 210 can execute the calculation processing process in the foregoing embodiment, and generate the corresponding control command, to control the first device to complete a corresponding presentation operation. After the stylus exits the presentation mode, the user cannot perform presentation control, and can complete interaction, for example, drawing, only by touching a screen of the first device.

The internal memory 221 may be configured to store computer executable program code, where the executable program code includes instructions. The processor 210 runs the instructions stored in the internal memory 221, to perform various functions and data processing of the stylus. The internal memory 221 may include a program storage region and a data storage region. The program storage region may store an operating system, an application required by at least one function (for example, a sound playing function or an image playing function), and the like. The data storage region may store data (for example, audio data and an address book) and the like created when the stylus is used. In addition, the internal memory 221 may include a high-speed random access memory, or may further include a non-volatile memory such as at least one magnetic disk storage device, a flash memory device, and a universal flash storage (universal flash storage, UFS).

In some embodiments, the internal memory 221 stores executable program code for implementing the method for controlling a stylus for presentation, to implement presentation control of the first device by the stylus.

The charging management module 240 is configured to receive a charging input from a charger. The charger may be a wireless charger or may be a wired charger. In some embodiments, the charging management module 240 may receive a charging input from the wired charger through the USB interface 230. In some embodiments, the charging management module 240 may receive a wireless charging input through a wireless charging coil of the stylus. There are the following several specific implementations of wireless charging of the stylus.

Implementation 1: the stylus is attached to the second device for charging. For example, the second device is a tablet 100 shown in (a) in FIG. 2D, the stylus is a stylus 101 shown in (a) in FIG. 2D, and the stylus 101 is attached to the tablet 100, to charge the stylus 101.

Implementation 2: the stylus is attached to a charging bar, and the charging bar is connected to a power supply, to charge the stylus. For example, the charging bar is a charging bar 201 shown in (b) in FIG. 2D, the stylus is the stylus 101 shown in (b) in FIG. 2D, and the stylus 101 is attached to the charging bar 201, and then is connected to the power supply such as a USB interface 230 of the tablet 100 shown in (b) in FIG. 2D through a data line 202, to charge the stylus 101.

Implementation 3: the stylus is inserted into an accommodating hole of a keyboard for charging. For example, the keyboard is a keyboard 204 shown in (c) in FIG. 2D, the stylus is the stylus 101 shown in (c) in FIG. 2D, an accommodating hole 205 is provided at a pivot of the keyboard 204, and the stylus 101 is inserted into the accommodating hole 205, to charge the stylus 101.

It should be understood that the listed implementations of wireless charging of the stylus are merely an example, and these do not constitute a limitation in actual implementation.

In addition, the charging management module 240 may supply power to the stylus through the power management module 241 while charging the battery 242.

The power management module 241 is configured to connect to the battery 242, the charging management module 240, and the processor 210. The power management module 241 receives input from the battery 242 and/or input from the charging management module 240, and supplies power to the processor 210, the internal memory 221, the wireless communication module 260, and the like.

A wireless communication function of the stylus may be implemented by using the antenna 1, the antenna 2, the mobile communication module 250, the wireless communication module 260, the modem processor, the baseband processor, and the like. In some embodiments, the wireless communication module 260 of the stylus provides near field wireless communication functions such as Bluetooth, Wi-Fi, and NFC, so that the stylus can establish near field communication with the first device and complete transmission of a control instruction.

The sensor module 280 may acquire one or more of the following information: gesture information (for example, a touch position, touch duration, and a quantity of touches) of a gesture performed by the user on the stylus; operation information (for example, a key on which press is performed, press duration, and a quantity of presses) of an operation performed by the user on the key of the stylus; an acceleration, an angular velocity, and/or a displacement of the stylus; an orientation of the stylus; and a moving trajectory of the stylus. It should be understood that the sensor module 280 may include at least one sensor that can directly or indirectly acquire the one or more pieces of information. This is not specifically limited in this embodiment of this application. For example, an acceleration sensor can directly acquire the acceleration, can obtain a speed by performing integration on the acceleration, and can obtain a displacement by performing integration on the speed again. That is, the acceleration sensor can also indirectly acquire the displacement.

In some embodiments, the sensor module 280 may include a pressure sensor 280A. The pressure sensor 280A is configured to sense a pressure signal, and may convert the pressure signal into an electrical signal. There are a plurality of types of pressure sensors 280A, for example, a resistive pressure sensor, an inductive pressure sensor, and a capacitive pressure sensor. When a gesture acts on the stylus or an operation acts on the key, the stylus may calculate gesture information (for example, a touch position, touch duration, and a quantity of touches) or operation information (for example, a key on which press is performed, press duration, and a quantity of presses) according to a signal detected by the pressure sensor 280A.

In some embodiments, the sensor module 280 may include a gyroscope sensor 280B. The gyroscope sensor 280B may acquire an angular velocity of the stylus around three axes (that is, x, y, and z axes).

In some embodiments, the sensor module 280 may include an acceleration sensor 280E. The acceleration sensor 280E may detect accelerations of the stylus in all directions (generally in three axes).

In a specific implementation, the gyroscope sensor 280B and the acceleration sensor 280E are combined and may be configured to determine a feature of a position change of the stylus in space, for example, the displacement of the stylus and the orientation of the stylus.

The key 290 may be a mechanical key, or a touch-type key. The stylus may receive a key-based input, and generate a key signal input related to a user setting and function control of the stylus. The key-based input may include inputs such as long press, single tap, double tap, and three tap. Different key-based inputs may correspond to different control instructions for controlling the first device to perform different presentation operations.

The motor 291 may generate a vibration prompt. The motor 291 may be used for touch vibration feedback. The motor 291 may correspond to different vibration feedback effects for a touch gesture acting on different regions of the stylus or different touch gestures acting on the same region.

The indicator 292 may be an indicator light, and may be configured to indicate a charging state, a power change, and the like.

Figure 3:
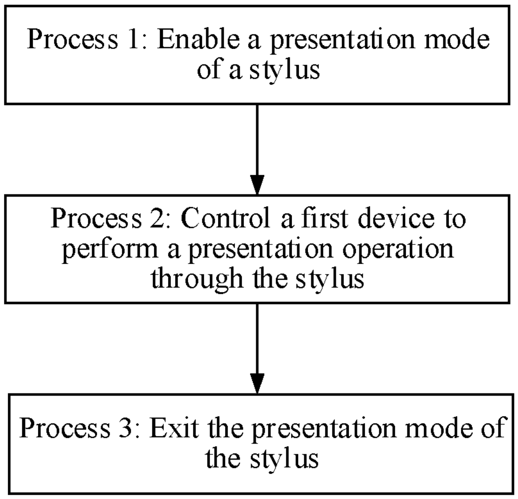
FIG. 3 is a schematic flowchart of a method for a stylus for presentation control according to an embodiment of this application.

Referring to FIG. 3, the method for using a stylus for presentation control provided in this embodiment of this application mainly includes three processes: process 1: Enable a presentation mode (which may also be referred to as a presentation page-flipping stylus mode, a page-flipping stylus, or an air mouse mode) of a stylus. Process 2: Control a first device to perform a presentation operation through the stylus. Process 3: Exit the presentation mode of the stylus. The three processes are separately described below.

Process 1: Enable a presentation mode of a stylus. In an operating system of the stylus, for example, a lightweight Internet of Things operating system (LiteOS), two operating modes of a handwriting mode and a presentation mode are maintained.

In the handwriting mode, interaction, for example, drawing or writing, can be completed only through contact between a tip of the stylus and a second device. Specifically, in a case of screen-on, the second device may periodically (for example 60 HZ, 90 HZ, or 120 HZ) send a first signal. The first signal is a square wave signal or a baseband signal. The first signal is used for triggering the stylus to send position information and pressure information of a touch operation performed by the stylus on a screen of the second device to the second device. In addition, a transmission distance of the first signal is generally less than a preset distance such as 20 mm or 30 mm. When a distance between the tip of the stylus and the screen of the second device is less than the preset distance, the first signal from the second device may be received. The stylus may send a second signal in response to the first signal. The second signal is also a square wave signal or a baseband signal. The second signal may be used for indicating the position information of the touch operation. It should be noted that neither the first signal nor the second signal is transmitted through a wireless communication link (for example, a Bluetooth link or a wifi link). In addition, the stylus may further send a third signal in response to the first signal. The third signal is used for indicating the pressure information of the touch operation. A difference from the second signal lies in that the third signal is generally transmitted through the wireless communication link. That is, the wireless communication link needs to be established between the second device and the stylus. In this way, the second device can obtain the second signal and the third signal from the stylus, to determine the position information and the pressure information, and then respond to the touch operation.

However, in the handwriting mode, the stylus cannot send a control command to a first device through the Bluetooth communication link, to control the first device to perform a presentation operation.

In the presentation mode, the stylus may generate the control command and send the control command to the first device through the wireless communication link, to control the first device to perform the presentation operation. That is, after enabling the presentation mode, the stylus can be used as a laser pen for presentation control.

For example, a flag bit is recorded in the operating system of the stylus. When a value of the flag bit is a first value (for example, the first value is 0), it indicates that the current operating mode of the stylus is the handwriting mode. When the value of the flag bit is a second value (for example, the second value is 1), it indicates that the current operating mode of the stylus is the presentation mode. Correspondingly, enabling the presentation mode of the stylus may be modifying the value of the flag bit as the second value.

It should be understood that in the presentation mode, the stylus may control the first device at a relatively long distance from the first device. In the handwriting mode, the stylus typically implements touch only when being close to the second device, for example, sends the second signal to the second device. Therefore, a transmission distance of the control command is generally greater than a transmission distance of the second signal.

A manner of enabling the presentation mode may include one or more of enabling the presentation mode by using the second device (which may be denoted as a manner 1), enabling the presentation mode by the stylus in response to a first gesture (a manner 2), enabling the presentation mode by the stylus in response to a fourth operation (a manner 3), intelligent enabling (a manner 4), and establishing a connection between the stylus and the first device (the notebook 103 shown in FIG. 1C) different from the second device (the tablet 100 shown in FIG. 1C) to trigger enabling of the presentation mode (a manner 5).

The manner 1 to the manner 4 are mainly applicable to a presentation scenario in which the first device and the second device are the same, for example, the scenario 1 shown in FIG. 1A, and the scenario 2 and the scenario 3 shown in FIG. 1B. Specific implementations of the manner 1 to the manner 4 are described below in detail.

Manner 1: enabling the presentation mode by using the second device.

A first control is provided in the second device, and the first control is configured to trigger switching of the operating mode of the stylus. For example, the second device is a tablet in FIG. 4. A setting of the tablet includes an accessibility setting item, and the accessibility setting item includes a sub-setting item 401. The tablet may display an interface 402 in response to a selection operation performed by a user on the sub-setting item 401, where the interface 402 is a setting page of the presentation mode. The interface 402 includes a button 403, and the button 403 is configured to trigger switching of the operating mode of the stylus, that is, the button 403 is the first control.

The second device may receive a fifth operation (which may also be referred to as an operation of switching a stylus mode) performed by the user on the first control. The fifth operation may be an operation such as long press, tap (for example, single tap or double tap), or sliding (upward sliding or downward sliding). This is not specifically limited in this embodiment of this application. The second device may send a second message to the stylus in response to the fifth operation, where the second message indicates the stylus to switch the operating mode. The stylus may switch the operating mode in response to receiving the second message. If the current operating mode of the stylus is the handwriting mode, the stylus may switch the operating mode to the presentation mode.

Figure 4:
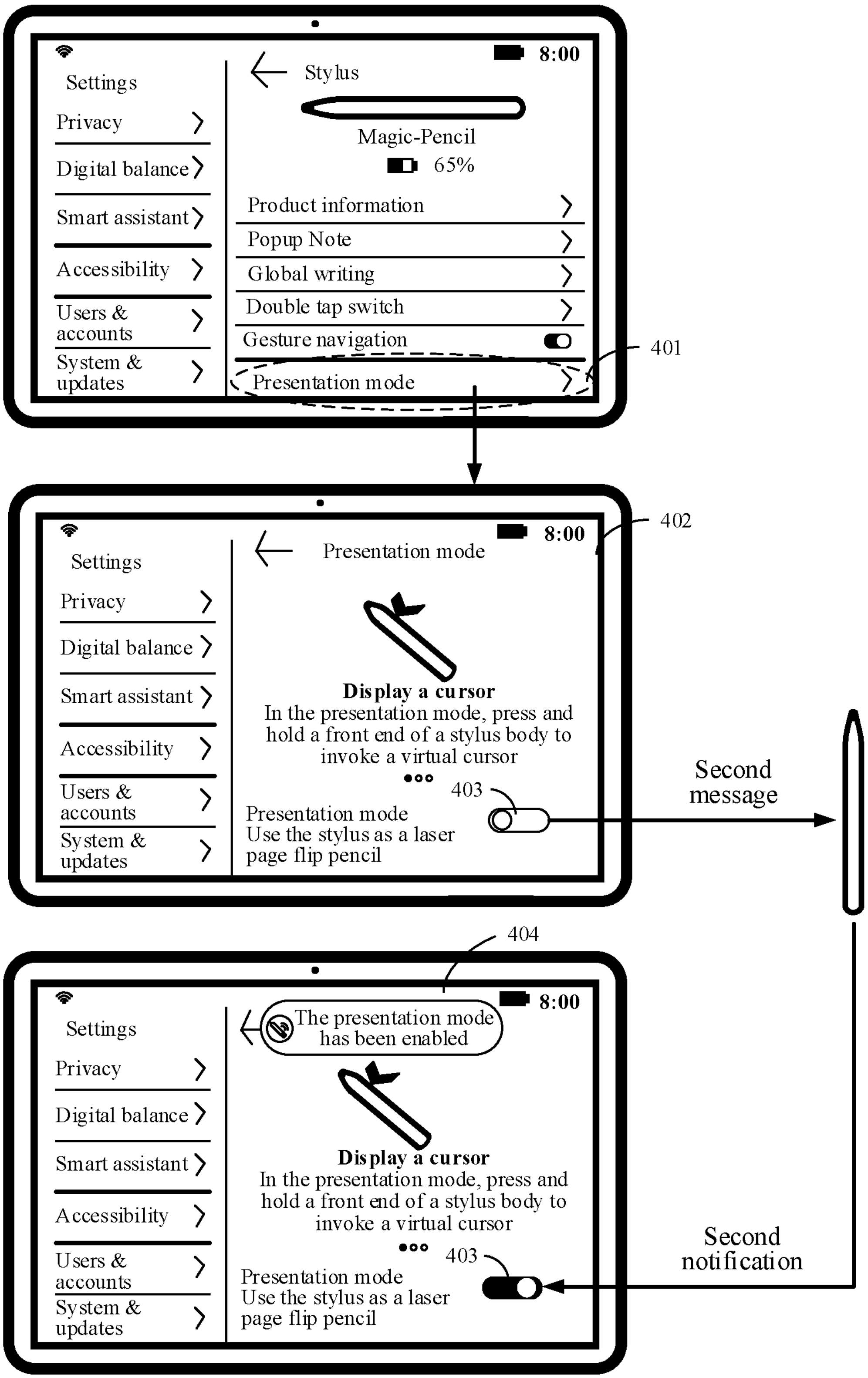
FIG. 4 is a first schematic diagram of enabling a presentation mode of a stylus according to an embodiment of this application.

For example, the first control is the button 403 in the interface 402 shown in FIG. 4, and the fifth operation is a tap operation. Therefore, the tablet may send, in response to the tap operation performed by the user on the button 403 in the interface 402, a second message to a stylus matching the tablet. The stylus may switch an operating mode after receiving the second message. It is assumed that the current operating mode of the stylus is the handwriting mode, the stylus may switch the operating mode to the presentation mode.

Further, the first control may further indicate whether the stylus enables the presentation mode, If the first control is in a first state, it indicates that the stylus does not enable the presentation mode. If the first control is in a second state, it indicates that the stylus has enabled the presentation mode. Based on the foregoing, in some embodiments, after switching the operating mode, the stylus may further send a second notification to the second device, where the second notification indicates that the operating mode has been successfully switched. The second device may switch the state of the first control in response to receiving the second notification. If the first control is currently in the first state, the first control is switched to the second state. If the first control is currently in the second state, the first control is switched to the first state. Therefore, the state of the first control is consistent with the operating mode of the stylus.

For example, the first control includes the button 403 in the interface 402 and the button 403 in an interface 404 shown in FIG. 4. The tablet may display the interface 402, and when the button 403 in the interface 402 is in the first state, it indicates that the stylus does not enable the presentation mode. In this case, after being switched from the handwriting mode to the presentation mode, the stylus may send a second notification to the tablet. The tablet may display the interface 404 in response to receiving the second notification, and when the button 403 in the interface 404 is in the second state, it indicates that the stylus has enabled the presentation mode.

It should be understood that content of the switching state of the first control is described in only the manner 1 of the process 1 in this specification. However, in the following, the second notification may be sent to the second device after the stylus switches the operating mode, to trigger the second device to switch the state of the first control. Details are not described below again.

A display position of the first control in FIG. 4 is merely an example, and this does not constitute a limitation in actual implementation. For example, the first control may alternatively be displayed in a pull-down notification bar interface of the second device. For another example, the first control may alternatively be displayed in a leftmost home screen.

Manner 2: enabling the presentation mode by the stylus in response to a first gesture (which may also be referred to as a switching operation). The first gesture may be a gesture such as long press, single tap, double tap, or three tap. The switching operation is an operation triggering the stylus to switch the operating mode to the presentation mode, which is the same in the following. An example in which the first gesture is a double tap gesture is mainly used for description below.

After a user touches a non-key region of the stylus, the stylus may acquire gesture information and then recognize a gesture type. If the stylus recognizes the double tap gesture, and the current operating mode of the stylus is the handwriting mode, the stylus may switch the operating mode to the presentation mode.

In some embodiments, the double tap gesture may be a double tap gesture performed by the user when the stylus faces any orientation, or the double tap gesture may be a double tap gesture performed by the user on any position of the stylus.

In a scenario of daily using the stylus, the tip of the stylus usually does not face upward. For a definition of upward, reference may be made to the related description of FIG. 2C, which is not described herein again and is the same in the following. For example, the second device is a tablet. In some scenarios, the tablet is horizontally placed on a plane (for example, a desktop), and when interaction, for example, drawing, is completed through contact between the tip of the stylus and the tablet, the tip of the stylus usually faces downward rather than upward. In some other scenarios, the tablet is vertically placed on a plane (for example, a desktop) through a support device (for example, a tablet protective case), and when interaction is completed through contact between the tip of the stylus and the tablet, the tip of the stylus is usually inclined downward rather than upward. In some other scenarios, when the stylus is not used, the stylus is placed on a plane (for example, a desktop) or is attached to the tablet, the tip of the stylus usually does not face upward.

Based on the foregoing, in some other embodiments, to avoid a case that the presentation mode is wrongly enabled after the user performs the double tap gesture on the stylus during daily use of the stylus, where the double tap gesture triggering enabling of the presentation mode is a double tap gesture when the tip of the stylus faces upward, In a case that the stylus recognizes the double tap gesture and the current operating mode of the stylus is the handwriting mode, it further needs to be determined whether an orientation of the tip of the stylus is upward. If the tip of the stylus faces upward, the stylus switches the operating mode to the presentation mode. In this way, accuracy of enabling the presentation mode can be improved.

Figure 5A:
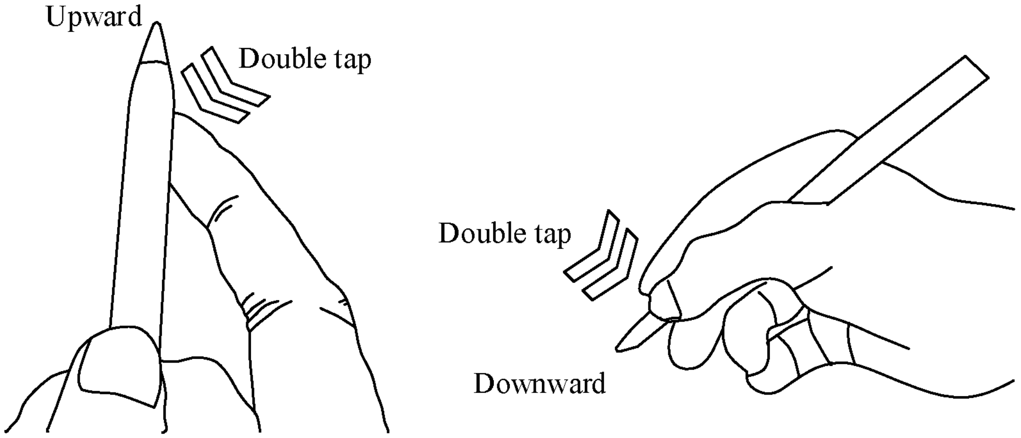
FIG. 5A is a second schematic diagram of enabling a presentation mode of a stylus according to an embodiment of this application.

For example, in a case that the operating mode of the stylus is the handwriting mode, as shown in (a) in FIG. 5A, the user makes the tip of the stylus upward and performs the double tap gesture on the stylus, and the stylus may switch the operating mode of the stylus to the presentation mode. In a case that the operating mode of the stylus is the handwriting mode, as shown in (b) in FIG. 5A, when the user writes by using the stylus, the tip of the stylus does not face upward, and if the user performs the double tap gesture on the stylus, the stylus does not switch the operating mode to the presentation mode.

It should be understood that in actual implementation, a person skilled in the art may flexibly set the orientation of the tip of the stylus to a first orientation according to an actual requirement, to allow switching to the presentation mode. The first orientation may be upward, downward, leftward, rightward, or the like.

To meet various use requirements of the user for the stylus, gestures on different touch regions of the stylus may correspond to different functions. For division of the touch region of the stylus, reference may be made to the descriptions of FIG. 2B and related content, which is not described herein again, and is the same in the following.

Based on the foregoing, in some other embodiments, the double tap gesture is a double tap gesture on a first preset region of the stylus, and the first preset region may be a front end (the first region shown in FIG. 2B), a middle end (the second region shown in FIG. 2B), or a rear end (the third region shown in FIG. 2B) of the stylus. That is, in a case that the stylus recognizes the double tap gesture and the current operating mode of the stylus is the handwriting mode, it further needs to be determined whether a touch position of the double tap gesture is within the first preset region. If the touch region of the double tap gesture is within the first preset region, the stylus switches the operating mode to the presentation mode. In this way, accuracy of enabling the presentation mode can be improved.

For the manner 2, it should be noted that that the stylus detects a touch gesture performed by the user on the stylus is a continuous action. In a case that the stylus is in the handwriting mode, the touch gesture performed by the user on the stylus is continuously detected, to trigger enabling of the presentation mode, causing relatively high power consumption and power loss of the stylus. Based on the foregoing, in some embodiments, in a case that the stylus is in the handwriting mode, the stylus may trigger detection of the touch gesture after detecting a first preset operation performed by the user on the key or detecting that an orientation of the stylus is a second orientation, and enable the presentation mode in response to detecting a first gesture. In this way, the power consumption of the stylus can be reduced.

Manner 3: enabling the presentation mode by the stylus in response to a fourth operation (which may also be referred to as a switching operation). The fourth operation may be specifically an operation such as long press, single tap, double tap, or three tap. An example in which the fourth operation is a long press operation is mainly used for description below.

After the user presses the key of the stylus, the stylus may acquire operation information (for example, a key on which press is performed, press duration, and a quantity of presses) and then recognize an operation type. In a case that the stylus recognizes the long press operation, and the current operating mode of the stylus is the handwriting mode, the stylus may switch the operating mode to the presentation mode.

Figure 5B:
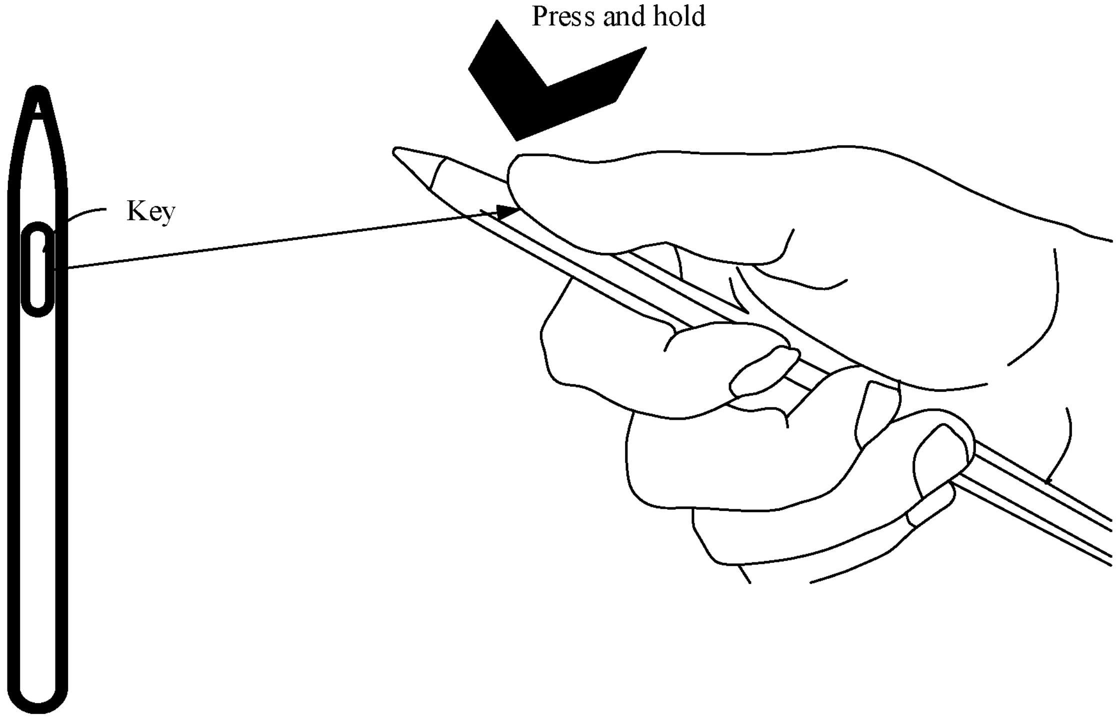
FIG. 5B is a third schematic diagram of enabling a presentation mode of a stylus according to an embodiment of this application.

For example, there is a key shown in FIG. 5B on the stylus. In a case that the stylus recognizes a long press operation shown in FIG. 5B performed by the user on the key and the current operating mode of the stylus is the handwriting mode, the stylus may switch the operating mode to the presentation mode.

A main function of the stylus is a handwriting function, and existence of the key is of little significance, so that the key arranged on the stylus is usually very limited. For example, only one key is arranged on the stylus. If the key is long pressed, power-on of the stylus may be triggered. If the key is single taped, power-off of the stylus may be triggered. If the key is double taped, the stylus may be triggered to send a Bluetooth broadcast. It should be understood that although tap operations such as three tap and four tap may also be used for implementing corresponding functions, a larger quantity of taps indicates less convenient operation, and the tap operation is not usually used actually. Therefore, in some scenarios, the fourth operation performed by the user on the key of the stylus is highly likely to conflict with an operation of implementing another function. For example, the fourth operation is the long press operation and is conflict with the operation of triggering power-on of the stylus.

Based on the foregoing, in some other embodiments, enabling of the presentation mode may be triggered based on the fourth operation (for example, the long press operation) with reference to the moving trajectory of the stylus (for example, the tip of the stylus). Correspondingly, in a case that the stylus recognizes the fourth operation and the current operating mode of the stylus is the handwriting mode, it further needs to be determined whether a first moving trajectory of the stylus meets a preset trajectory condition within a time period at which the user performs the fourth operation on the key of the stylus. If the first moving trajectory meets the preset trajectory condition, the stylus switches the operating mode to the presentation mode. If the first moving trajectory does not meet the preset trajectory condition, the stylus cannot set the operating mode to the presentation mode. The preset trajectory condition may be that a first preset trajectory is a preset shape such as a circle or a "Z" shape. In this way, function conflict can be avoided. Therefore, this allows the stylus to respond accurately.

Figure 5C:
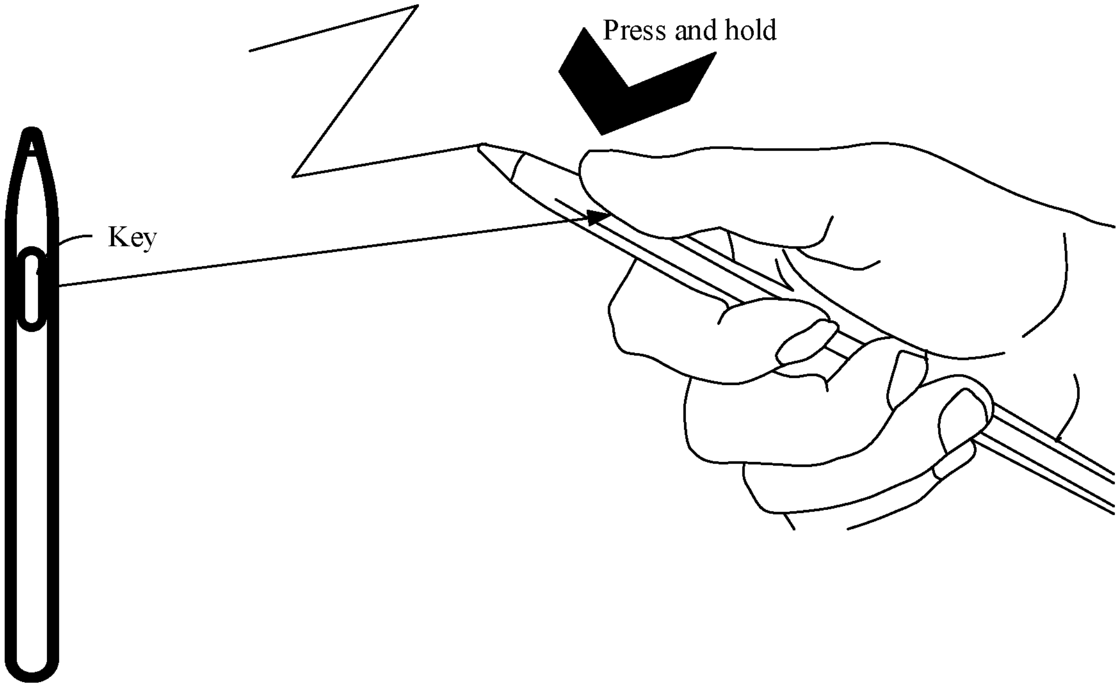
FIG. 5C is a fourth schematic diagram of enabling a presentation mode of a stylus according to an embodiment of this application.

For example, the fourth operation is the long press operation, and the preset trajectory condition is that the first moving trajectory is the "Z" shape. There is a key shown in FIG. 5C on the stylus. In a case that the current operating mode of the stylus is the handwriting mode, the stylus recognizes a long press operation shown in FIG. 5C performed by the user on the key and detects that the first moving trajectory of the stylus is the "Z" shape shown in FIG. 5C during the long press operation, that is, meets the preset trajectory condition, and the stylus may switch the operating mode to the presentation mode.

In some scenarios, the first gesture performed by the user on the stylus or the fourth operation performed by the user on the key of the stylus may be only a misoperation of the user and does not mean that the user has the intention to enable the presentation mode.

Figure 6:
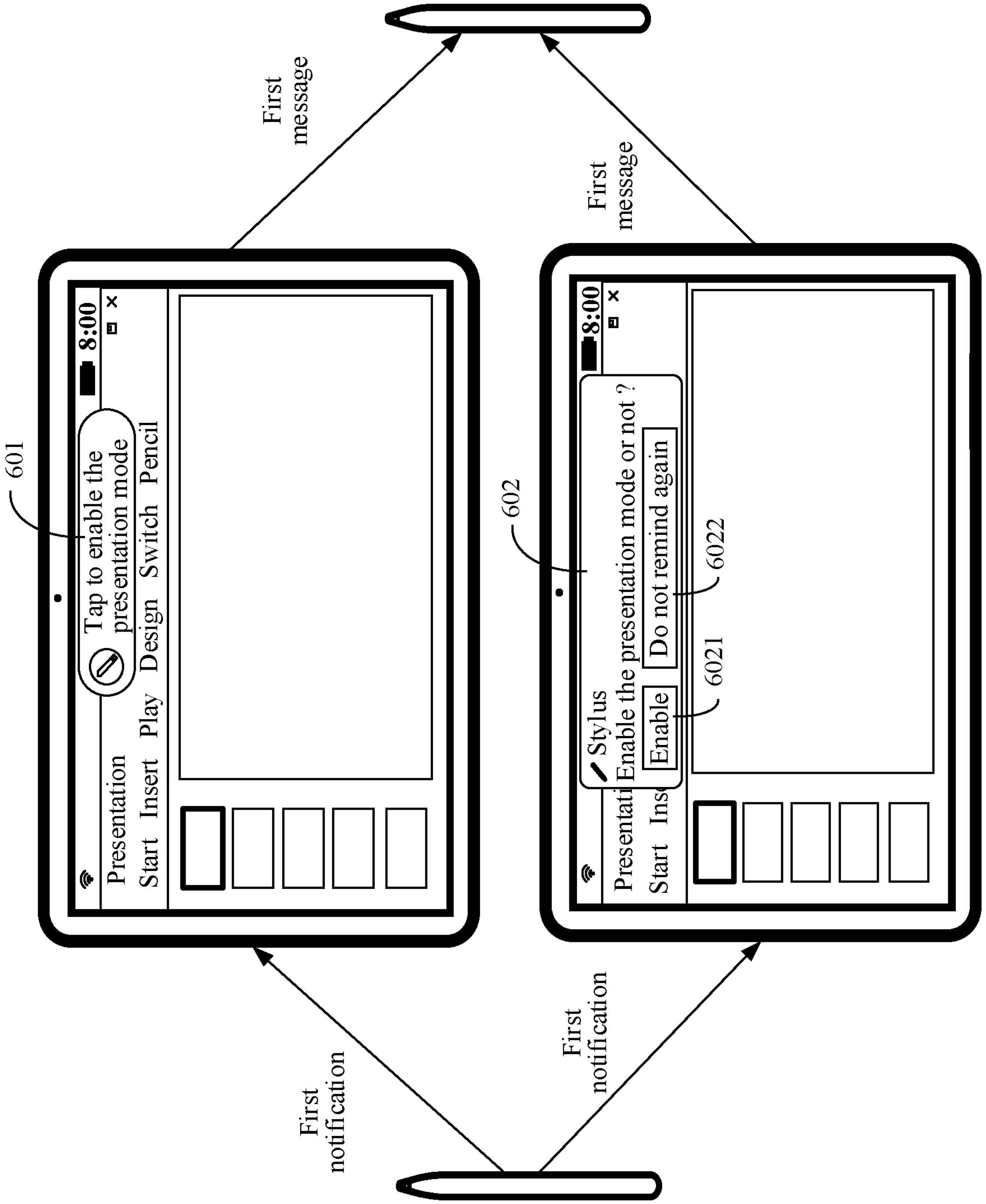
FIG. 6 is a fifth schematic diagram of enabling a presentation mode of a stylus according to an embodiment of this application.

Based on the foregoing, in some embodiments, in the manner 2 or the manner 3, before switching the operating mode to the presentation mode, the stylus sends a first notification to the second device. The first notification is used for notifying a second device to prompt the user to confirm that the presentation mode is switched to. In response to receiving the first notification, the second device may display first prompt information in a pop-up window, broadcast first prompt information through voice, and/or vibrate, to prompt the user to confirm enabling of the presentation mode. The first prompt information is used for prompting the user to confirm enabling of the presentation mode. For example, the first prompt information is a prompt 601 in FIG. 6, and prompt content in the prompt 601 includes "tap to enable the presentation mode", to prompt to confirm enabling of the presentation mode.

The second device may receive a sixteenth operation performed by the user on the first prompt information. The sixteenth operation is used for triggering enabling of the presentation mode. The second device may send a first message to the stylus in response to the sixteenth operation, where the first message indicates that switching to the presentation mode is confirmed. The stylus may switch the operating mode to the presentation mode in response to receiving the first message.

In a specific implementation, the sixteenth operation may be a tap operation or a long press operation performed by the user on the first prompt information. For example, the first prompt information is the prompt 601 in FIG. 6, and the sixteenth operation may be a tap operation performed by a finger of the user or the stylus on the prompt 601.

In another specific implementation, the first prompt information includes a first option and a second option. The first option is used for triggering enabling of the presentation mode, the second option is used for triggering cancellation of enabling of the presentation mode, and the sixteenth operation may be a selection operation on the first option. For example, the first prompt information is a prompt 602 in FIG. 6, the first option is an "enable" button 6021 in the prompt 602, and the second option is a "do not remind again" button 6022 in the prompt 602. The sixth operation may be a selection operation performed by the user on the "enable" button 6021.

In some other embodiments, in the manner 2 or the manner 3, before the stylus switches the operating mode to the presentation mode, the stylus may play prompt voice or vibrate, to prompt the user to confirm that the presentation mode is switched to. Then, the stylus detects an operation or a gesture performed by the user on the stylus within a preset time period after the user is prompted to confirm that the presentation mode is switched to. The stylus switches the operating mode to the presentation mode in response to detecting a second preset operation or a second preset gesture (which may be collectively referred to as a second operation).

Manner 4: intelligent enabling. In a case that the current operating mode of the stylus is the handwriting mode, if the second device detects that there is a presentation requirement, the second device may automatically send a third message to the stylus, where the third message is used for indicating the stylus to enable the presentation mode. In this way, the presentation mode is intelligently enabled.

The presentation requirement usually appears in a preset application such as PPT or WPS. Based on the foregoing, in some embodiments, the second device may detect whether a first application currently running in the foreground of the second device is a preset application, and if the first application is the preset application, the second device may send the third message to the stylus.

Figure 7A:
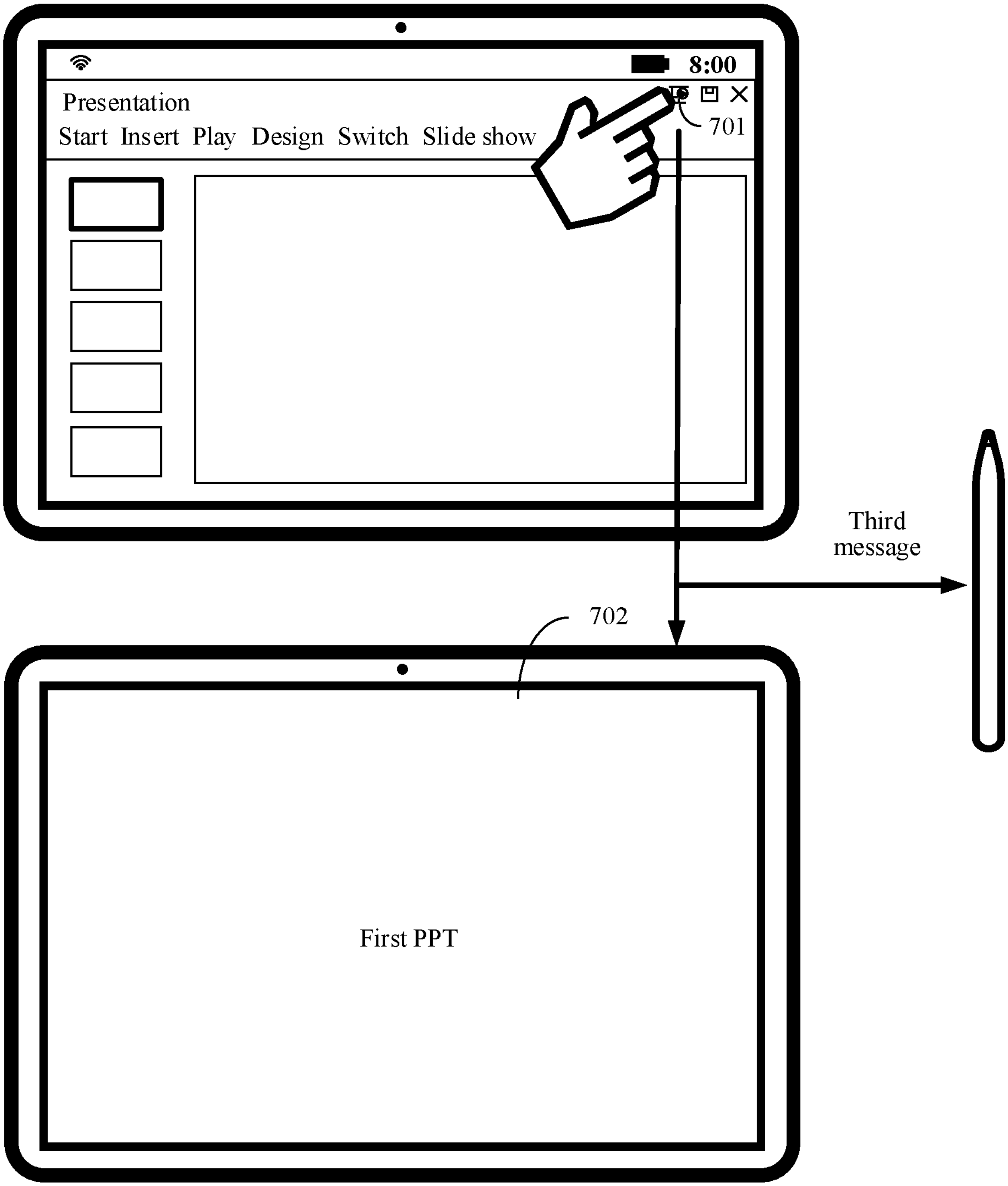
FIG. 7A is a sixth schematic diagram of enabling a presentation mode of a stylus according to an embodiment of this application.

Further, the presentation requirement appears in a preset use scenario of the preset application, for example, the preset use scenario is a scenario of playing a slideshow in full screen. It should be understood that during running of the preset application, after receiving a specific operation (which may be referred to as a sixth operation) of the user, the preset application can enter the preset use scenario. For example, the preset application is PPT. The sixth operation may be a tap operation performed by the user on a control of playing a slideshow in full screen, and after receiving the tap operation performed by the user on the control of playing a slideshow in full screen, the PPT application can enter the scenario of playing a slideshow in full screen. Based on the foregoing, in some embodiments, in a case that the first application is the preset application, the second device may enter the preset use scenario in response to receiving the sixth operation, and may further display sending the third message to the stylus. For example, the second device is a tablet in FIG. 7A, the preset application is a PPT application in the tablet, and the control of playing a slideshow in full screen is a button 701 in FIG. 7A. In a case that the current operating mode of the stylus is the handwriting mode, the tablet may display an interface 702 in FIG. 7A in response to a tap operation performed by the user on the button 701, where a first PPT is displayed in the interface 702 in full screen, that is, the tablet enters a scenario of playing a slideshow in full screen. In addition, the tablet may send a third message to the stylus, to indicate the stylus to switch the operating mode to the presentation mode.

Figure 7B:
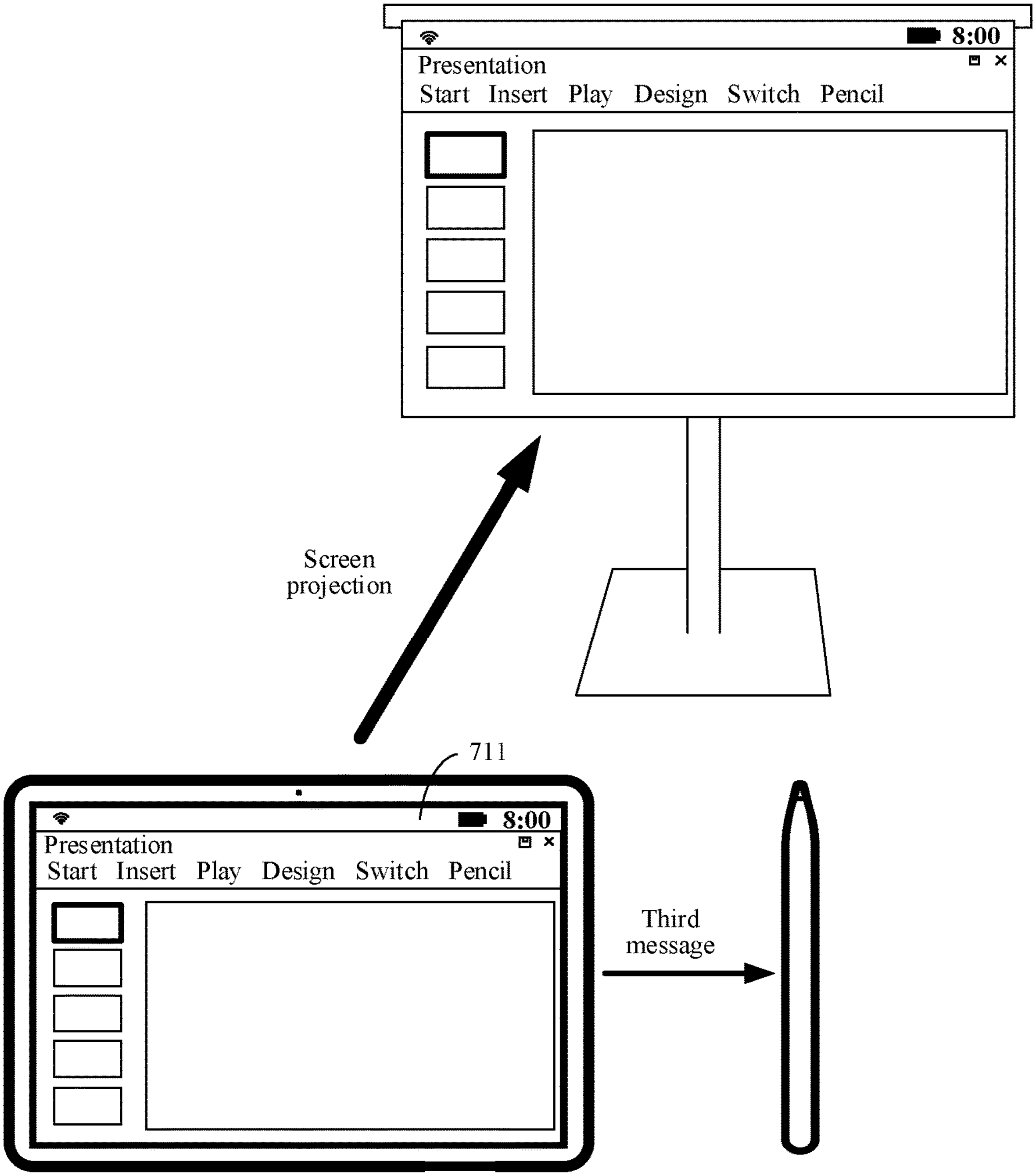
FIG. 7B is a seventh schematic diagram of enabling a presentation mode of a stylus according to an embodiment of this application.

The presentation requirement may also appear in a scenario of projecting content in the second device to a screen-projected device. Based on the foregoing, in some embodiments, the second device may detect whether the second device is connected to the screen-projected device. The second device may send the third message to the stylus in response to detecting that the second device is connected to the screen-projected device. For example, the second device is a tablet in FIG. 7B, and the screen-projected device is a projector in FIG. 7B. In a case that the current operating mode of the stylus is the handwriting mode, the tablet may send a third message to the stylus in response to detecting that the tablet is connected to the projector.

Further, there may be a deviation in a detection result of the second device on the presentation requirement. For example, the second device may detect that there is the presentation requirement, but the user may not have the presentation requirement actually. Based on the foregoing, in some embodiments, after detecting that there is the presentation requirement, the second device first displays second prompt information before sending the third message to the stylus, where the second prompt information is used for prompting to confirm enabling of the presentation mode. Subsequently, the second device may receive a seventh operation performed by the user on the second prompt information, where the seventh operation is used for triggering confirmation of enabling of the presentation mode. The second device sends the third message to the stylus in response to the seventh operation. In this way, accuracy of intelligently enabling the presentation mode can be improved. The second prompt information is similar to the first prompt information. For details, reference may be made to the description of the first prompt information. Details are not described herein again. The seventh operation is also similar to the sixteenth operation. For details, reference may be made to the description of the sixteenth operation. Details are not described herein again. A specific implementation of this embodiment is described below by using FIG. 7C as an example.

Figure 7C:
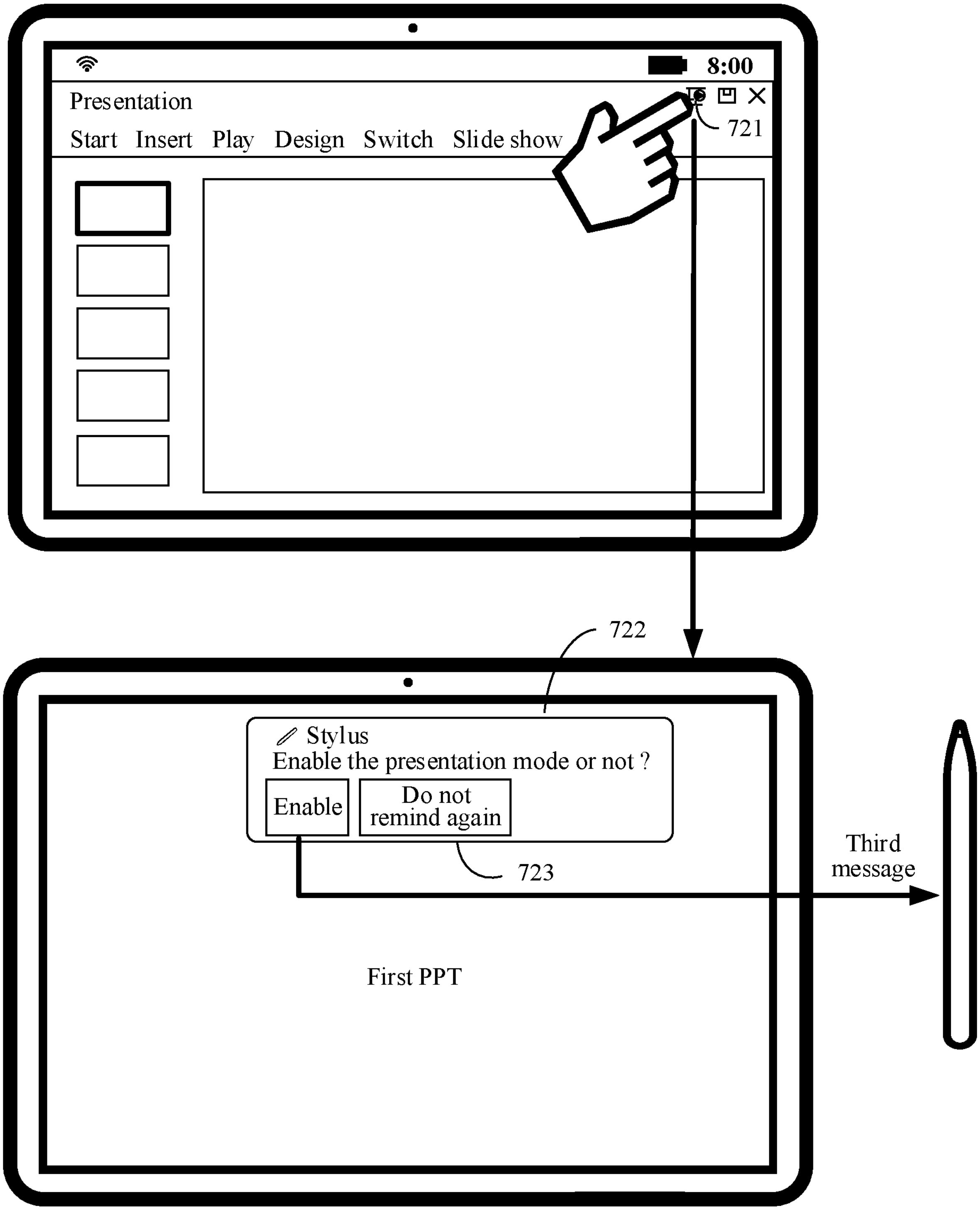
FIG. 7C is an eighth schematic diagram of enabling a presentation mode of a stylus according to an embodiment of this application.

For example, the second device is a tablet in FIG. 7C, the preset application is a PPT application in the tablet, and the control of playing a slideshow in full screen is a button 721 in FIG. 7C. In a case that the current operating mode of the stylus is the handwriting mode, the tablet may display an interface 722 in FIG. 7C in response to a tap operation performed by the user on the button 721, where a first PPT is displayed in the interface 722 in full screen, that is, the tablet enters a scenario of playing a slideshow in full screen. In addition, a prompt 723 is further displayed in the interface 722, and prompt content in the prompt 723 includes "enable the presentation mode or not", to prompt to confirm enabling of the presentation mode. That is, the prompt 723 is the second prompt information. The prompt 723 includes an "enable" button, and the seventh operation may be a tap operation on the "enable" button. The tablet sends a third message to the stylus in response to the tap operation performed by the user on the "enable" button in the prompt 723.

The manner 1 to the manner 4 have been described, and the manner 5 starts to be described below. The manner 5 is mainly applicable to different presentation scenarios of the first device and the second device, for example, the scenario 4 shown in FIG. 1C.

Manner 5: the stylus establishes a connection to the first device (the notebook 103 shown in FIG. 1C) different from the second device (the tablet 100 shown in FIG. 1C) to trigger enabling of the presentation mode. In the manner 5, in a case that the current operating mode of the stylus is the handwriting mode, if the stylus detects that the stylus establishes a connection to the first device different from the second device, the stylus may switch the operating mode to the presentation mode.

In some embodiments, a wireless connection between the first device and the stylus may be established through a near field communication technology such as NFC or radio frequency identification (Radio Frequency Identification, RFID).

In some other embodiments, a wireless connection between the first device and the stylus may be established through Bluetooth. It should be understood that establishing a Bluetooth connection requires the stylus to send a Bluetooth broadcast. After the stylus sends the Bluetooth broadcast, if a distance between the first device and the stylus is within a Bluetooth communication distance range, the first device may receive the Bluetooth broadcast sent by the stylus, that is, may find the stylus. For example, a stylus option is displayed in a Bluetooth device list. Then, a Bluetooth connection can be established between the first device and the stylus automatically or manually by the user.

To facilitate searching of the stylus by the first device, the stylus may always send the Bluetooth broadcast. However, keeping sending the Bluetooth broadcast causes relatively high power consumption of the stylus. Based on the foregoing, in a specific implementation, the stylus starts to send the Bluetooth broadcast in response to a third event and ends sending of the Bluetooth broadcast in response to a fourth event. In this way, the power consumption of the stylus can be reduced.

The third event may be a second gesture performed by the user on the stylus, and the second gesture and the first gesture may be the same or different. The stylus starts to send the Bluetooth broadcast in response to the second gesture. Alternatively, the third event may be an eighth operation performed by the user on the key of the stylus, and the eighth operation may be the same as the fourth operation or may be different from the fourth operation. The stylus starts to send the Bluetooth broadcast in response to the eighth operation.

Alternatively, a second control is provided in the second device, and the third event may be a ninth operation performed by the user on the second control, for example, a long press operation or a tap operation. The second control and the first control may be the same control or may be different controls. If the second control and the first control are the same control, the ninth operation may be the foregoing fifth operation. The second device may receive the ninth operation performed by the user on the second control, and the second device may send a fourth message to the stylus in response to the ninth operation. The fourth message indicates the stylus to send the Bluetooth broadcast. The stylus may start to send the Bluetooth broadcast in response to receiving the fourth message.

Figure 8:
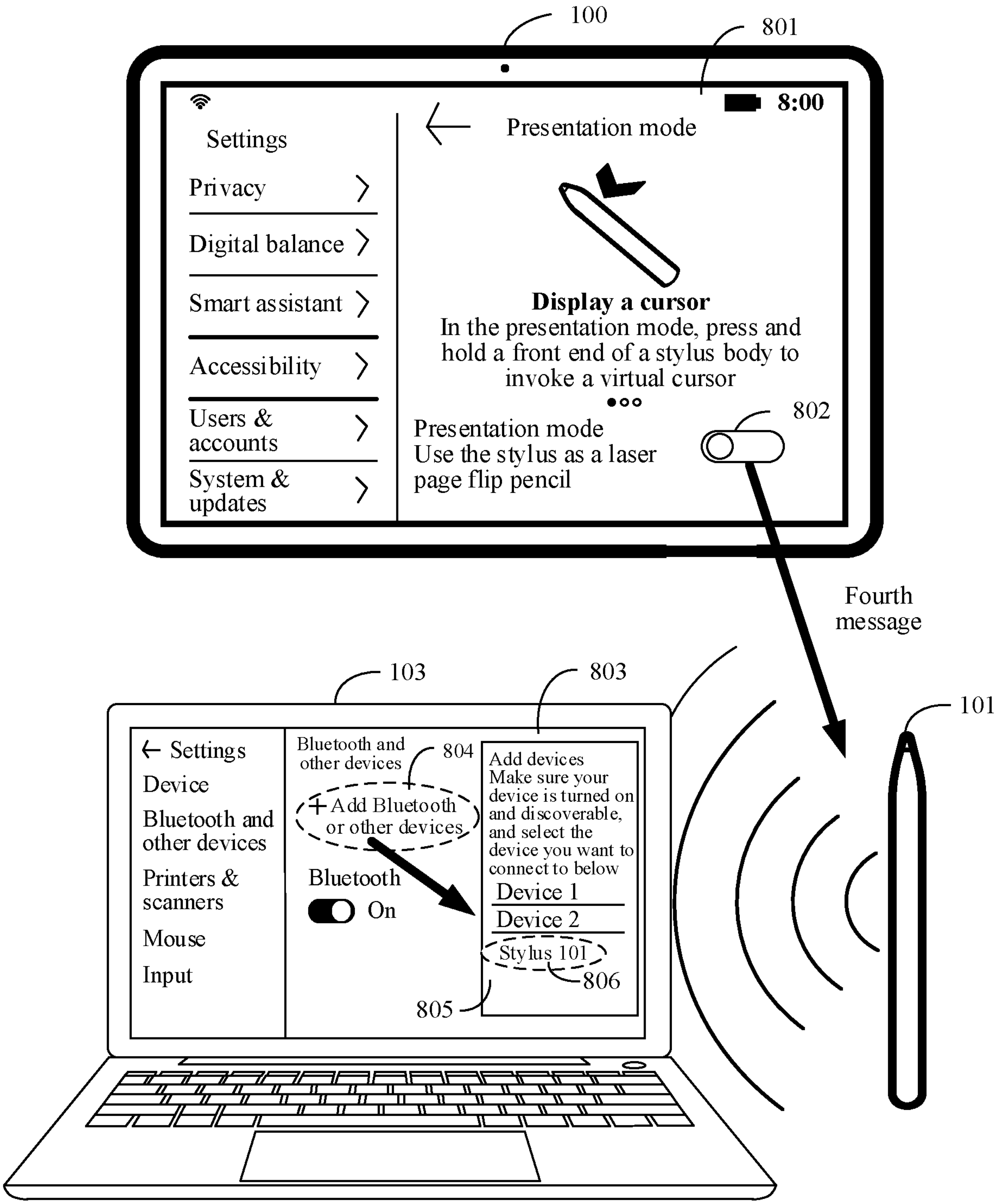
FIG. 8 is a ninth schematic diagram of enabling a presentation mode of a stylus according to an embodiment of this application.

For example, the first device is a tablet 100 in FIG. 8, the stylus is a stylus 101 in FIG. 8, the second device is a notebook 103 in FIG. 8, the third event is a seventh operation performed by the user on the second control, the second control is the same as the first control and is a button 802 in an interface 801 displayed in the tablet 100 shown in FIG. 8, and the ninth operation is a tap operation. The tablet 100 may send a fourth message to the stylus 101 in response to the tap operation performed by the user on the button 802 in the interface 801. The stylus 101 may start to send a Bluetooth broadcast in response to receiving the fourth message. In addition, the notebook 103 may display a dialog box 805 in response to a tap operation performed by the user on a button 804, that is, a control of adding a Bluetooth device, in an interface 803, where the Bluetooth device searched by the notebook 103 may be displayed in the dialog box 805. After the stylus 101 starts to send the Bluetooth broadcast, when a distance between the notebook 103 and the stylus 101 is within a Bluetooth communication distance range, an option of the stylus 101, for example, an option 806, may be displayed in the dialog box 805. Then, a Bluetooth connection between the notebook 103 and the stylus 101 may be established in the notebook 103

The fourth event may correspond to the third event. For example, the third event is a double tap gesture, and the fourth event may also be a double tap gesture. After receiving one double tap gesture, the stylus may start to send the Bluetooth broadcast, and when receiving the double tap gesture again, the stylus may end sending of the Bluetooth broadcast. Alternatively, the fourth may not correspond to the third event. For example, the third event is a double tap gesture, and the fourth event is a long press gesture. Alternatively, the fourth event may be an event that duration for the stylus to send the Bluetooth broadcast reaches third preset duration, for example, the third preset duration is five minutes.

Actually, the use of the stylus is relatively undiversified, and some users only use the stylus for writing rather than for presentation control. For such a user, if it is recognized that the presentation mode needs to be enabled in any one of the manner 1 to the manner 5, it does not usually represent a real intention of the user.

Based on the foregoing, in some embodiments, a third control is provided in the second device, and the third control is configured to trigger the second device to switch a switch status of a presentation function. The second device may receive a tenth operation performed by the user on the third control. The tenth operation may be an operation such as long press, tap (for example, single tap or double tap), or sliding (upward sliding or downward sliding). This is not specifically limited in this embodiment of this application. The second device may update the switch status of the presentation function in response to the tenth operation. Only in a case that the presentation function is enabled, it can indicate that the user is allowed to use the stylus in a presentation scenario, and then the presentation mode can be enabled in the manner 1 to the manner 5. In this way, accuracy of enabling the presentation mode can be improved.

Figure 9:
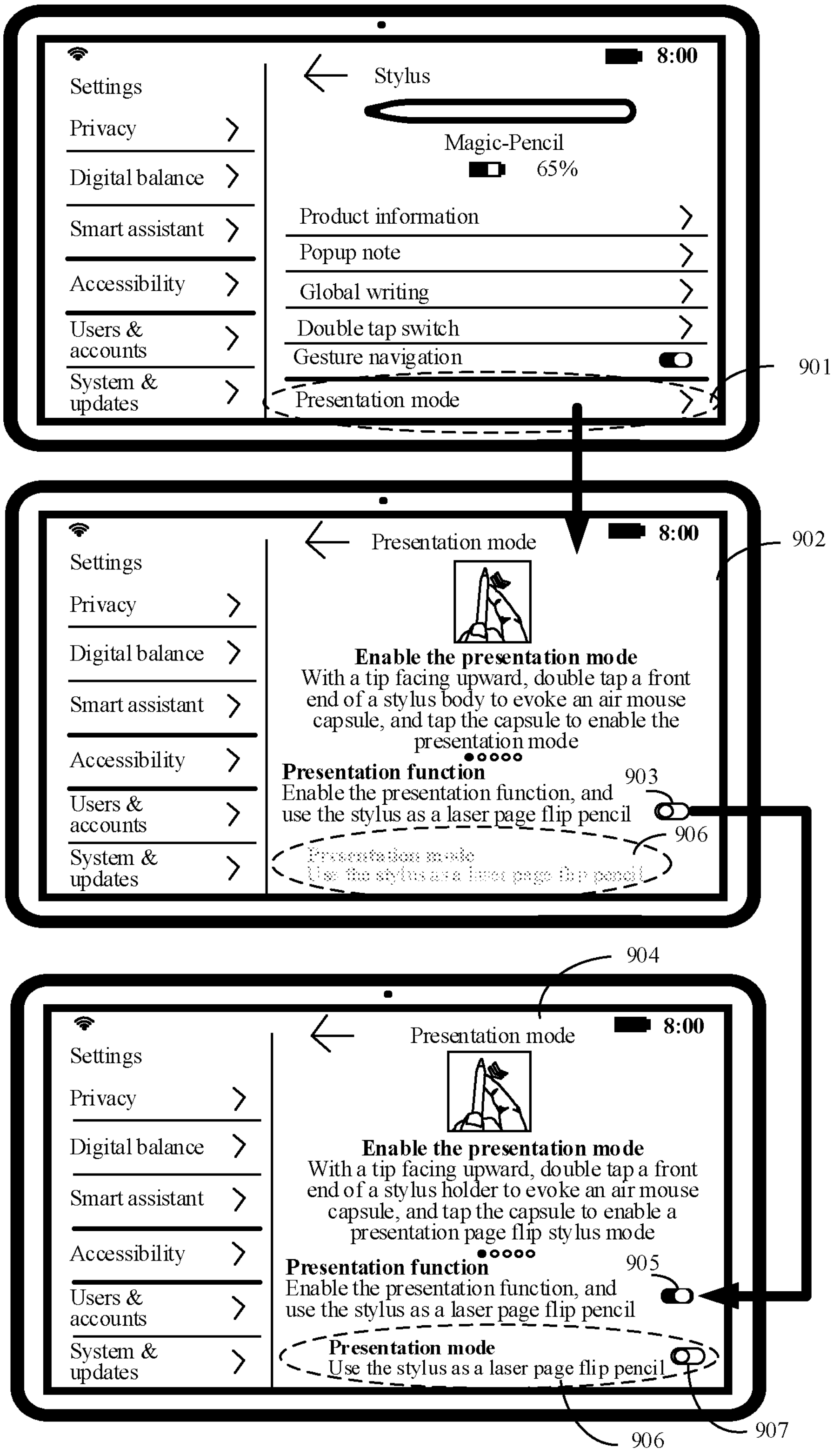
FIG. 9 is a tenth schematic diagram of enabling a presentation mode of a stylus according to an embodiment of this application.

For example, the second device is a tablet in FIG. 9. A setting of the tablet includes an accessibility setting item, and the accessibility setting item includes a sub-setting item 901. The tablet may display an interface 902 in response to a selection operation performed by the user on the sub-setting item 901, where the interface 902 is a setting page of the presentation mode. The interface 902 includes a button 903, and the button 903 is configured to trigger the second device to switch a switch status of a presentation function, that is, the button 903 is the third control. In addition, the button 903 indicates that the presentation function is currently in a disabled state. For example, the tenth operation is a tap operation performed by the user on the button 903. Therefore, the tablet may display an interface 904 in FIG. 9 in response to the tap operation performed by the user on the button 903, where the interface 904 includes a button 905, and the button 905 may also be configured to trigger the second device to switch the switch status of the presentation function, that is, the button 905 is also the third control. However, a difference from the button 903 lies in that the button 905 indicates that the presentation function is currently in an enabled state. That is, the second device updates the switch status of the presentation function from the disabled state to the enabled state in response to the tap operation performed by the user on the button 903.

Correspondingly, in this embodiment, in the manner 1 to the manner 5, before switching the operating mode to the presentation mode, the stylus further needs to determine whether the presentation function is enabled. If the stylus determines that the presentation function has been enabled, the stylus may further switch the operating mode to the presentation mode. In a specific implementation, before switching the operating mode to the presentation mode, the stylus may query the second device for the switch status of the presentation function. If the stylus finds that the presentation function is in the enabled state, the stylus may enable the presentation mode. In another specific implementation, the stylus may record the switch status of the presentation function. After updating the switch status of the presentation function, the second device may send a third notification to the stylus. The third notification is used for notifying the stylus of synchronizing the switch status of the presentation function. The stylus may synchronize the switch status of the presentation function in response to receiving the third notification, so that the switch status of the presentation function recorded in the stylus is consistent with the updated switch status of the presentation function in the second device.

In addition, in this embodiment, in a case that the switch status of the presentation function is in the enabled state, the second device may display the operable first control, so that the presentation mode can be conveniently enabled in the manner 1. In a case that the switch status of the presentation function is in the disabled state, the second device may not display the operable first control, for example, does not display the first control or display an unoperable first control.

For example, the tablet may display the interface 904 shown in FIG. 9, the button 905 in the interface 904 is the third control, and the button 905 indicates that the presentation mode is in the enabled state. That is, the switch status of the presentation function is the enabled state. In this case, the interface 904 may further include a setting item 906. The setting item 906 includes an operable button 907, and the button 907 is configured to trigger switching to the presentation mode. That is, the operable first control is displayed.

For another example, the tablet may display the interface 902 shown in FIG. 9, the button 903 in the interface 902 is the third control, and the button 903 indicates that the presentation mode is in the disabled state. That is, the switch status of the presentation function is the enabled state. In this case, the interface 902 includes the setting item 906, but the setting item 906 is in gray and does not include the button 907. That is, the operable first control is not displayed.

Figure 10:
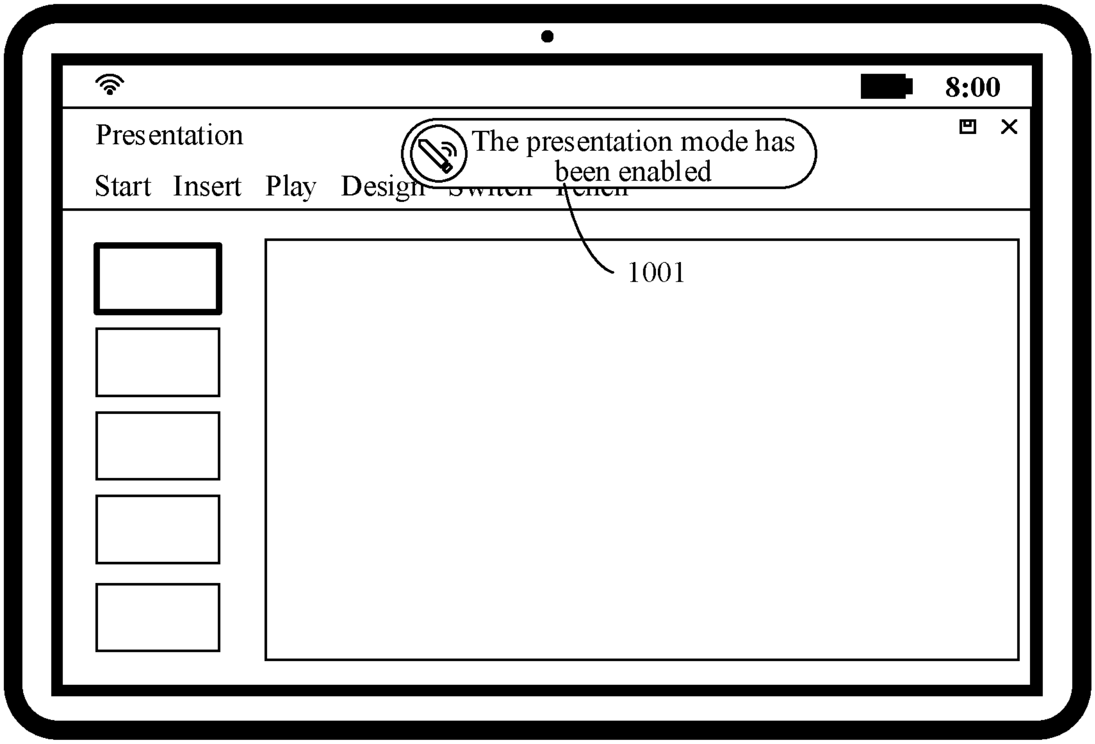
FIG. 10 is an eleventh schematic diagram of enabling a presentation mode of a stylus according to an embodiment of this application.

After enabling the presentation mode in the manner 1 to the manner 5, the stylus may play third prompt information through voice or vibration, to prompt the user that the presentation mode has been enabled. Alternatively, after switching the operating mode to the presentation mode, the stylus may send a fourth notification to the first device and/or the second device, where the fourth notification is used for notifying the first device and/or the second device of prompting the user that the presentation mode has been enabled. The first device and/or the second device may display the third prompt information in a pop-up window, voice-broadcast the third prompt information, and/or vibrate in response to receiving the fourth notification, to prompt the user that the presentation mode has been enabled. For example, the first device is a tablet in FIG. 10, the third prompt information may be a prompt 1001 displayed in the tablet in FIG. 10, and the prompt 1001 includes prompt content "the presentation mode has been enabled", to prompt that the presentation mode has been enabled.

For ease of description, the event of enabling the presentation mode in the manner 1 to the manner 5 may be referred to as a first event. For example, the first event is that the stylus detects the switching operation such as the first gesture or the fourth operation (for example, the long press operation) performed by the user on the stylus. For another example, the first event is that the second message from the second device is received.

Process 2: Control a first device to perform a presentation operation through the stylus. When the stylus is in the presentation mode (for example, the value of the flag bit is the second value), the stylus may send a control command to the first device in response to an event such as a gesture, an operation, movement performed by the user on the stylus, to control the first device to perform a presentation operation. When the stylus is in the handwriting mode (for example, the value of the flag bit is the first value), the stylus may not detect the event, for example, does not detect the gesture performed by the user on the stylus, so that the stylus does not send the corresponding control command to the first device, and cannot control the first device to perform the presentation operation. Alternatively, when the stylus is in the handwriting mode (for example, the value of the flag bit is the first value), the stylus may detect the event, but does not send the corresponding control command to the first device in response to detecting the event, and also cannot control the first device to perform the presentation operation.

The presentation operation mainly includes one or more of displaying a cursor, moving the cursor, a tap operation, a marking operation, a magnification operation, and a page flipping operation. A specific implementation of the process 2 is described below mainly for the cursor display operation, the cursor moving operation, the tap operation, and the page flipping operation.

Presentation operation 1: displaying a cursor. That is, a cursor is displayed in a display interface of the first device, where the cursor may be configured to point to content displayed in a screen of the first device.

In some embodiments, after switching the operating mode to the presentation mode, the stylus may control the first device to display the cursor based on a third gesture (which may also be referred to as a first operation) performed by the user on the stylus. The third gesture may be a gesture such as long press, single tap, double tap, or three tap. An example in which the third gesture is a long press gesture is mainly used for description below.

After the user touches the non-key region of the stylus, the stylus may acquire gesture information (for example, a touch position, touch duration, and a quantity of touches), and then recognize a gesture type. If the stylus recognizes the long press gesture and the current operating mode of the stylus is the presentation mode, the stylus may send a first control command (which may also be referred to as a first command) to the first device. The first control command is used for controlling the first device to display the cursor. The first device may display the cursor in the display interface in response to receiving the first control command.

Figure 11A:
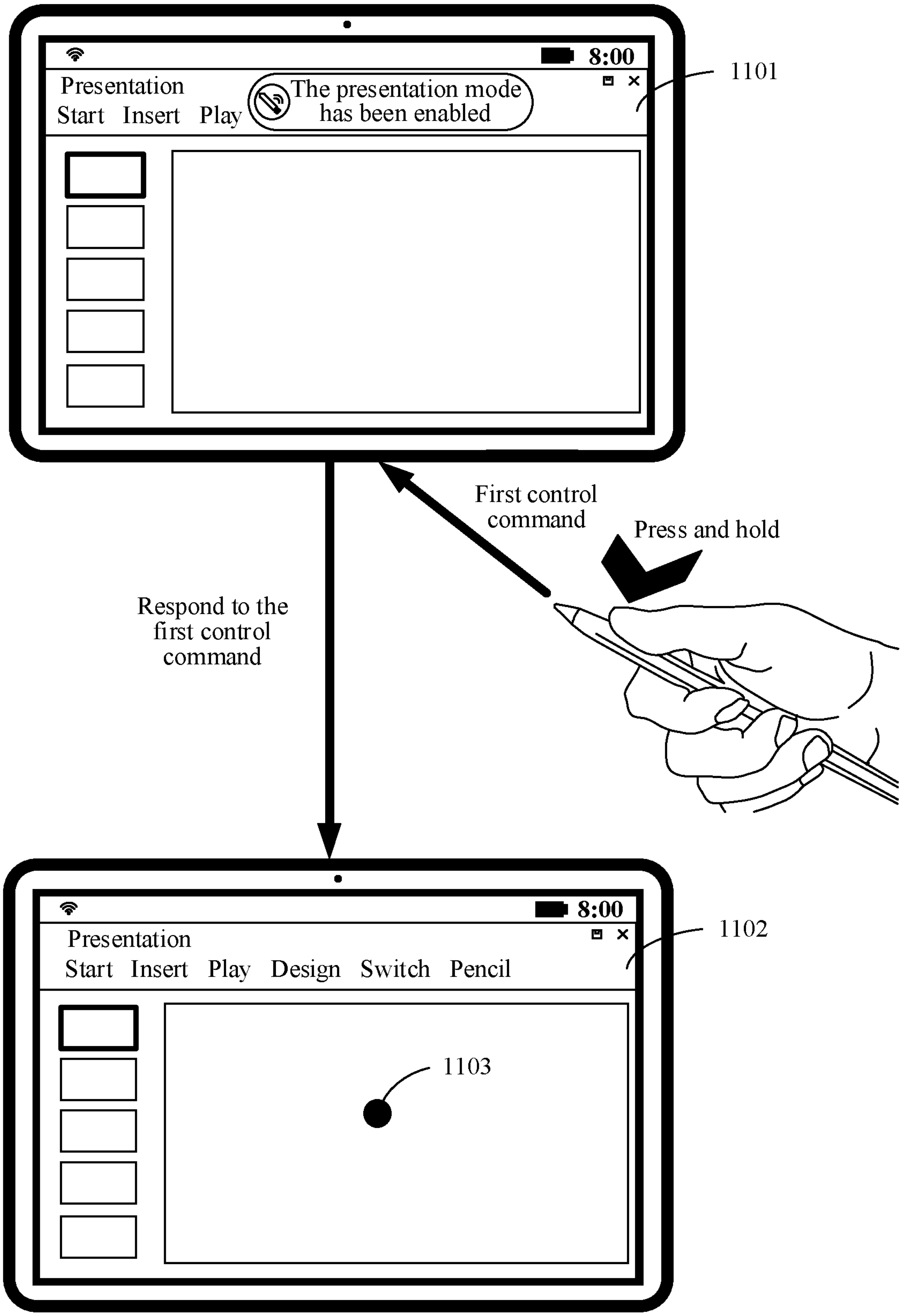
FIG. 11A is a first schematic diagram in which a stylus controls a first device to display a cursor according to an embodiment of this application.

For example, the first device is a tablet in FIG. 11A, and the tablet may display an interface 1101. In a case that the stylus recognizes a long press gesture and the current operating mode of the stylus is the presentation mode, the stylus may send a first control command to the tablet. The tablet may display an interface 1102 in response to receiving the first control command, where the interface 1102 includes a cursor 1103.

In addition, the long press gesture may be a long press gesture on any position of the stylus or may be a long press gesture on a second preset region (for example, the front end, the middle end, or the rear end) of the stylus. For details, reference may be made to the related description of the first gesture above, and details are not described herein again.

In some other embodiments, after switching the operating mode to the presentation mode, the stylus may control the first device to display the cursor based on an eleventh gesture (which may also be referred to as a first operation) performed by the user on the key of the stylus. The eleventh operation may be an operation such as long press, single tap, double tap, or three tap. An example in which the eleventh operation is a long press operation is mainly used for description below.

After the user presses the key of the stylus, the stylus may acquire operation information (for example, a key on which press is performed, press duration, and a quantity of presses) and then recognize an operation type. In a case that the stylus recognizes the long press operation and the current operating mode of the stylus is the presentation mode, the stylus may send a first control command to the first device. The first control command is used for controlling the first device to display the cursor. The first device may display the cursor in the display interface in response to receiving the first control command.

Figure 11B:
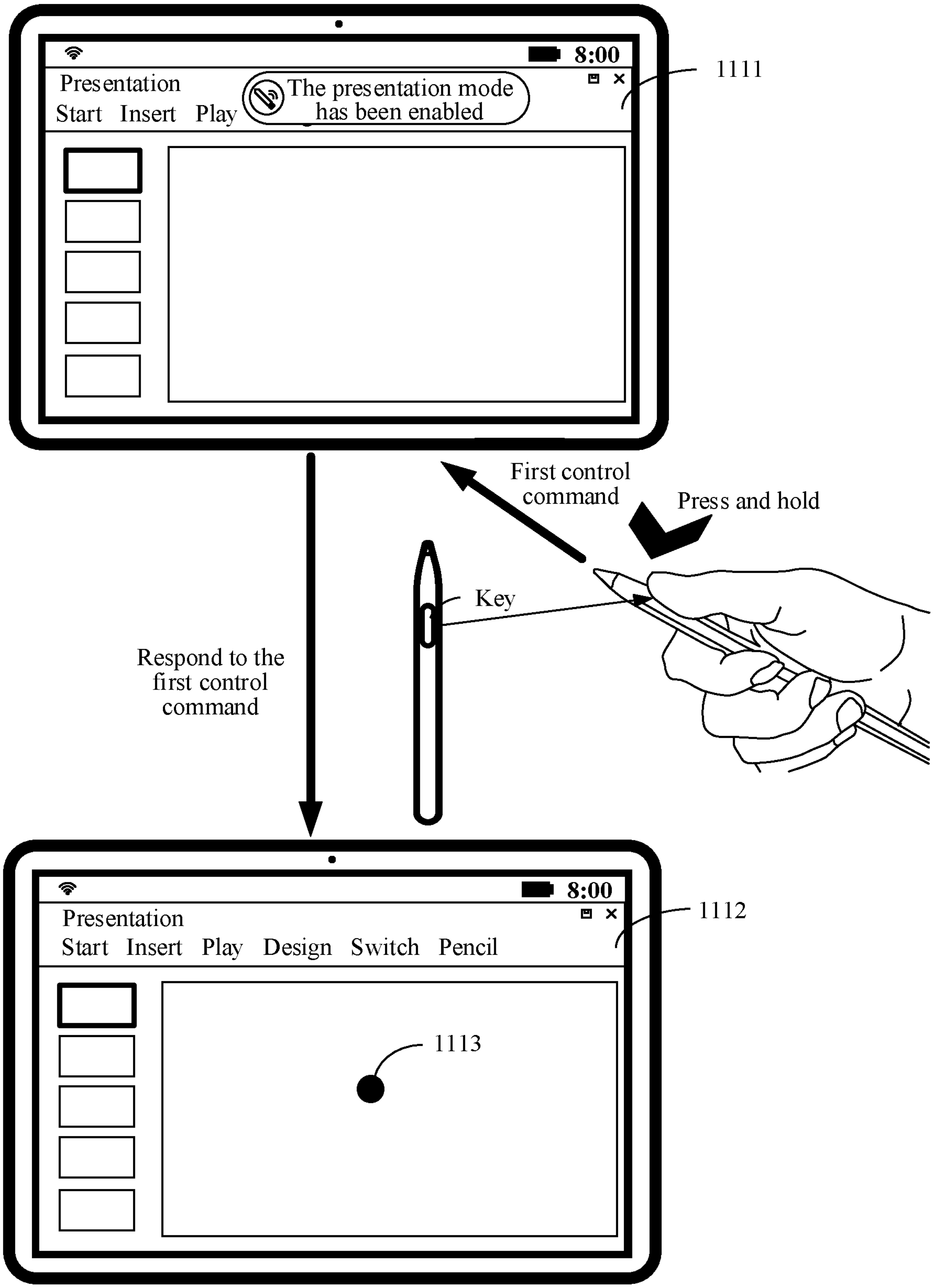
FIG. 11B is a second schematic diagram in which a stylus controls a first device to display a cursor according to an embodiment of this application.

For example, the first device is a tablet in FIG. 11B, and the tablet may display an interface 1111. In a case that the stylus recognizes a long press operation and the current operating mode of the stylus is the presentation mode, the stylus may send a first control command to the tablet. The tablet may display an interface 1112 in response to receiving the first control command, where the interface 1112 includes a cursor 1113.

After the stylus enables the presentation mode currently, the first device may first display the cursor at a preset position of the display interface in response to first receiving the first control command. The preset position may be a position such as a center point, an upper left corner, or an upper right corner of the display interface.

In some embodiments, after the cursor is first displayed, the cursor is displayed in the display interface for a long time and does not disappear until the stylus exits the presentation mode. Therefore, corresponding content in the display interface is conveniently pointed in any time.

In some other embodiments, when duration from a current time to an end moment of the third gesture or the eleventh operation reaches fourth preset duration, for example, five seconds or 10 seconds, the first device may stop displaying the cursor. In this way, the cursor can be displayed in a targeted manner. In addition, the fourth preset duration is reserved, so that after the cursor points to target content (for example, a web page link), it can be convenient for the stylus to control the first device to perform the presentation operation such as tapping or marking on the target content.

For example, after detecting the third gesture or the eleventh operation, the stylus may send the first control command to the first device, to control the first device to start to display the cursor. Then, after detecting that the third gesture or the eleventh operation ends, the stylus may send a sixth notification to the first device. The sixth notification is used for indicating an end time of the third gesture or the eleventh operation. The first device may stop displaying the cursor in response to receiving the sixth notification when duration from receiving the sixth notification reaches the fourth preset duration.

For another example, after detecting the third gesture or the eleventh operation, the stylus may send the first control command to the first device, to control the first device to start to display the cursor. Then, the stylus may periodically detect whether the third gesture or the eleventh operation ends. If the third gesture or the eleventh operation does not end, the stylus continues to send the first control command to the first device, to control the first device to continue to display the cursor. If the third gesture or the eleventh operation ends, the stylus no longer sends the first control command to the first device. When duration of not receiving the first control command exceeds the fourth preset duration, the first device stops displaying the cursor.

That is, if execution of the third gesture or the eleventh operation starts at a third moment and ends at a fourth moment, after receiving the first control command, the first device may display the cursor within a time period between a first moment and a second moment and the first device does not display the cursor after the second moment. The third moment is earlier than the first moment, and the fourth moment is earlier than the second moment.

In this embodiment, after the cursor disappears, in response to receiving the first control command again, the first device displays the cursor at a position where the cursor disappears last time.

In some other embodiments, the cursor is displayed in the display interface for a long time. However, before duration from a current time to an end moment of the third gesture or the eleventh operation reaches fourth preset duration, the cursor is displayed in a first pattern (for example, a color pattern), where the first pattern may indicate that the cursor is valid, that is, movable. After the duration from the current time to the end moment of the third gesture or the eleventh operation reaches the fourth preset duration, the cursor is displayed in a second pattern (for example, a gray pattern), where the second pattern may indicate that the cursor is invalid, that is, immovable. In this way, the cursor can point to the content in the display interface in any time, and the user can know a status of the cursor.

Presentation operation 2: moving the cursor. That is, the first device moves a display position of the cursor, to move the cursor to target content, so that the cursor points to the target content.

When the user performs the third gesture on the stylus or performs the eleventh operation on the key of the stylus (for example, within the time period between the third moment and the fourth moment), for example, the user moves the stylus (which may be referred to as a third operation) to change a position of the stylus in space, the stylus may acquire a first displacement of the stylus and calculate a second displacement of the cursor in the first device according to the first displacement. Then, the stylus sends a second control command (which may also be referred to as a second command) to the first device, where the second control command carries the second displacement and is used for indicating the first device to control the cursor to move the second displacement, that is, control the first device to change the display position of the cursor.

Figure 12:
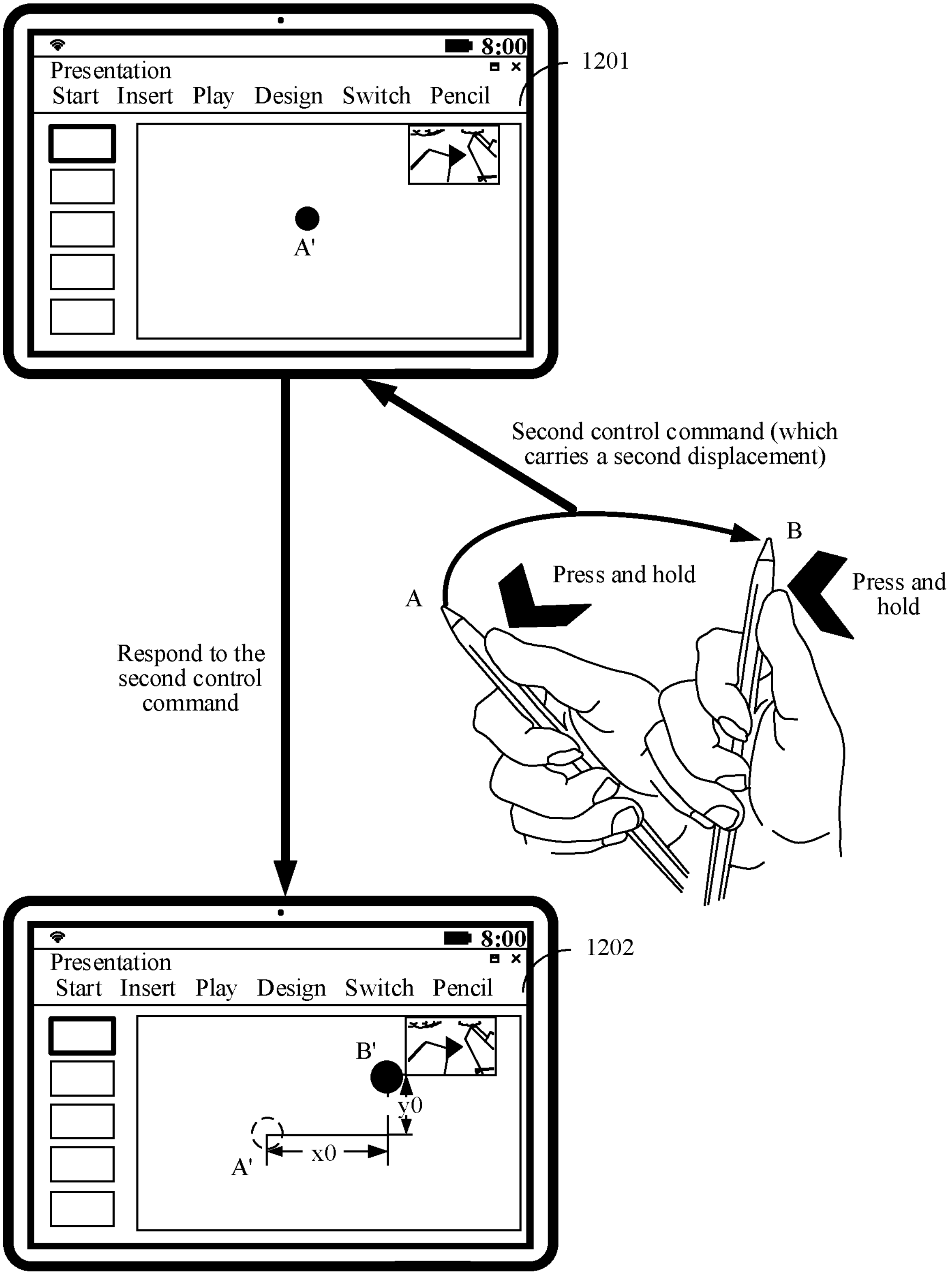
FIG. 12 is a schematic diagram in which a stylus controls a first device to move a cursor according to an embodiment of this application.

For example, the third gesture is a long press gesture, and the first device is a tablet in FIG. 12. The tablet may display an interface 1201, a cursor is displayed at A' in the interface 1201, and A' is relatively far from a video in the interface 1201. When the user performs the long press gesture on the stylus, the stylus acquires that the tip of the stylus moves from a point A to a point B in FIG. 12. That is, the first displacement is a displacement from the point A to the point B. Corresponding to the displacement of the tip from the point A to the point B, the stylus may calculate a second displacement of the cursor, for example, (x0, y0). Then, the stylus sends a second control command to the first device to indicate the first device to move the cursor by (x0, y0). The first device may display an interface 1202 in response to receiving the second control command, where the cursor is displayed at B' in the interface 1202, and B' is relatively close to the video in the interface 1202. That is, when the user performs the long press gesture on the stylus, as the user moves the tip of the stylus from the point A to the point B, the first device may correspondingly move the cursor from A' to the position B' in the interface. Subsequently, as the stylus is continuously moved, the first device may further move the cursor to the video, to point to the video.

Presentation operation 3: tap operation. That is, the first device taps content corresponding a position of the cursor in the display interface.

If the cursor is currently displayed in the display interface of the first device, the position of the cursor is a current display position of the cursor. If the first device does not display the cursor after the presentation mode is enabled, the position of the cursor is a preset position, for example, a center point of the display interface. If the first device displays the cursor after the presentation mode is enabled, but the cursor has disappeared, that is, the cursor is not currently displayed in the display interface, the position of the cursor is a display position of the cursor in the display interface of the first device before disappearing. That is, regardless of whether the cursor is displayed in the display interface of the first device, corresponding content may be taped through the tap operation. An example in which the first device performs the tap operation when the cursor is displayed in the display interface of the first device is used for description below.

In some embodiments, after switching the operating mode to the presentation mode, the stylus may control the first device to display the cursor based on a fourth gesture performed by the user on the stylus. The fourth gesture may be a gesture such as long press, single tap, double tap, or three tap. An example in which the fourth gesture is a double tap gesture is mainly used for description below.

After the user touches the non-key region of the stylus, the stylus may acquire gesture information (for example, a touch position, touch duration, and a quantity of touches), and then recognize a gesture type. If the stylus recognizes the double tap gesture and the current operating mode of the stylus is the presentation mode, the stylus may send a third control command to the first device. The third control command is used for indicating the first device to perform the tap operation on content corresponding to the position of the cursor. The first device may tap the content corresponding to the position of the cursor in response to receiving the third control command.

Figure 13A:
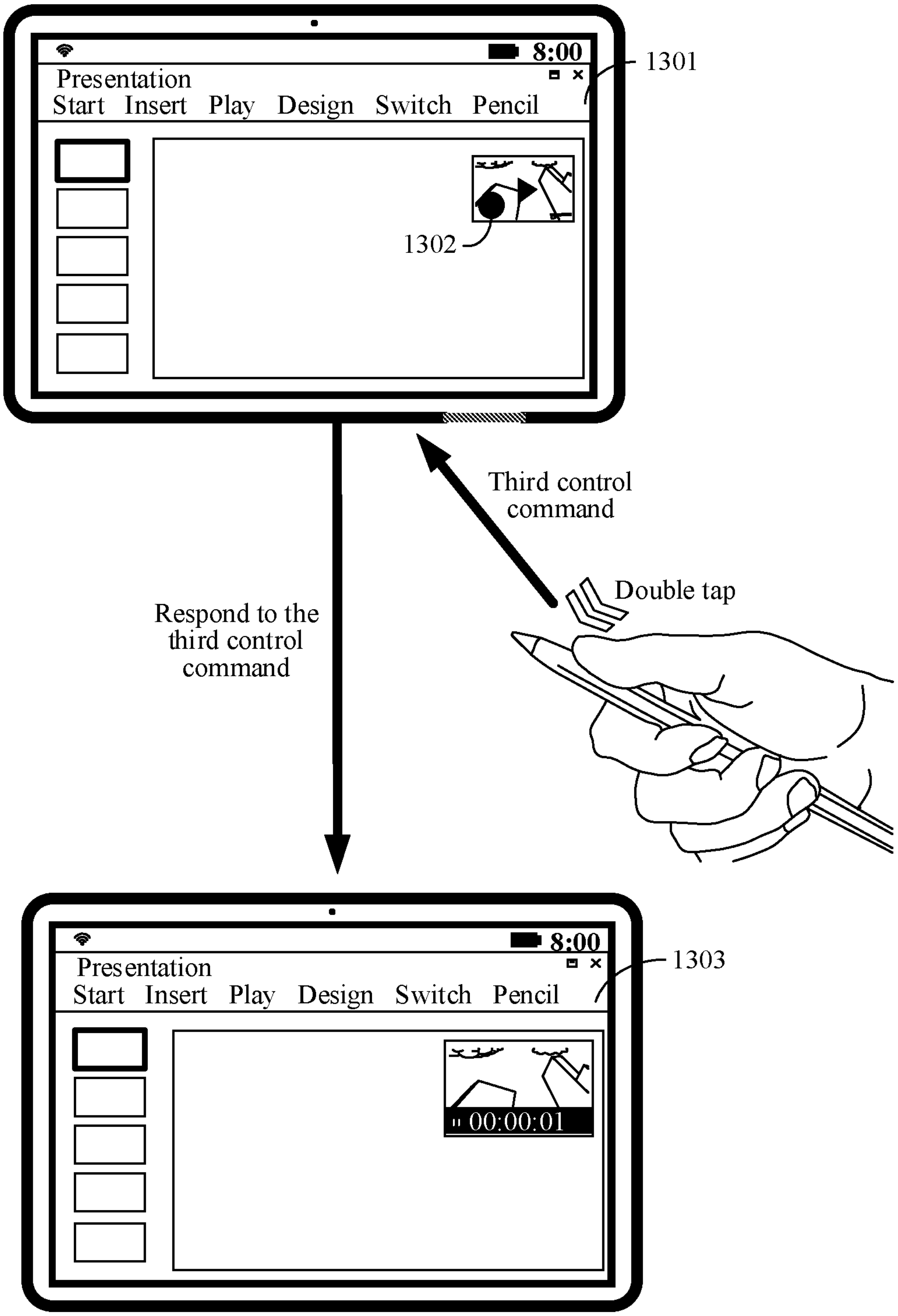
FIG. 13A is a first schematic diagram in which a stylus controls a first device to perform a tap operation according to an embodiment of this application.

For example, the first device is a tablet in FIG. 13A, the tablet may display an interface 1301, the interface 1301 includes a cursor 1302, and the cursor 1302 is located on a to-be-played video. In this case, when recognizing a double tap gesture, the stylus may send a third control command to the tablet. The tablet may display an interface 1303 in response to receiving the third control command, and the video is playing in the interface 1303. That is, the tablet performs a tap operation on the to-be-played video at a position of the cursor 1302 in response to receiving the third control command, so that the tablet starts to play video content.

In addition, the double tap gesture may be a double tap gesture on any position of the stylus or may be a long press gesture on a third preset region (for example, the front end, the middle end, or the rear end) of the stylus. Details are not described herein again.

In some other embodiments, after switching the operating mode to the presentation mode, the stylus may control the first device to perform the tap operation based on a twelfth operation performed by the user on the key of the stylus. The twelfth operation may be an operation such as long press, single tap, double tap, or three tap. An example in which the twelfth operation is a single tap operation is mainly used for description below.

After the user presses the key of the stylus, the stylus may acquire operation information (for example, a key on which press is performed, press duration, and a quantity of presses) and then recognize an operation type. In a case that the stylus recognizes the single tap operation and the current operating mode of the stylus is the presentation mode, the stylus may send a third control command to the first device. The third control command is used for indicating the first device to perform the tap operation on content corresponding to the position of the cursor. The first device taps the content corresponding to the position of the cursor in response to receiving the third control command.

Figure 13B:
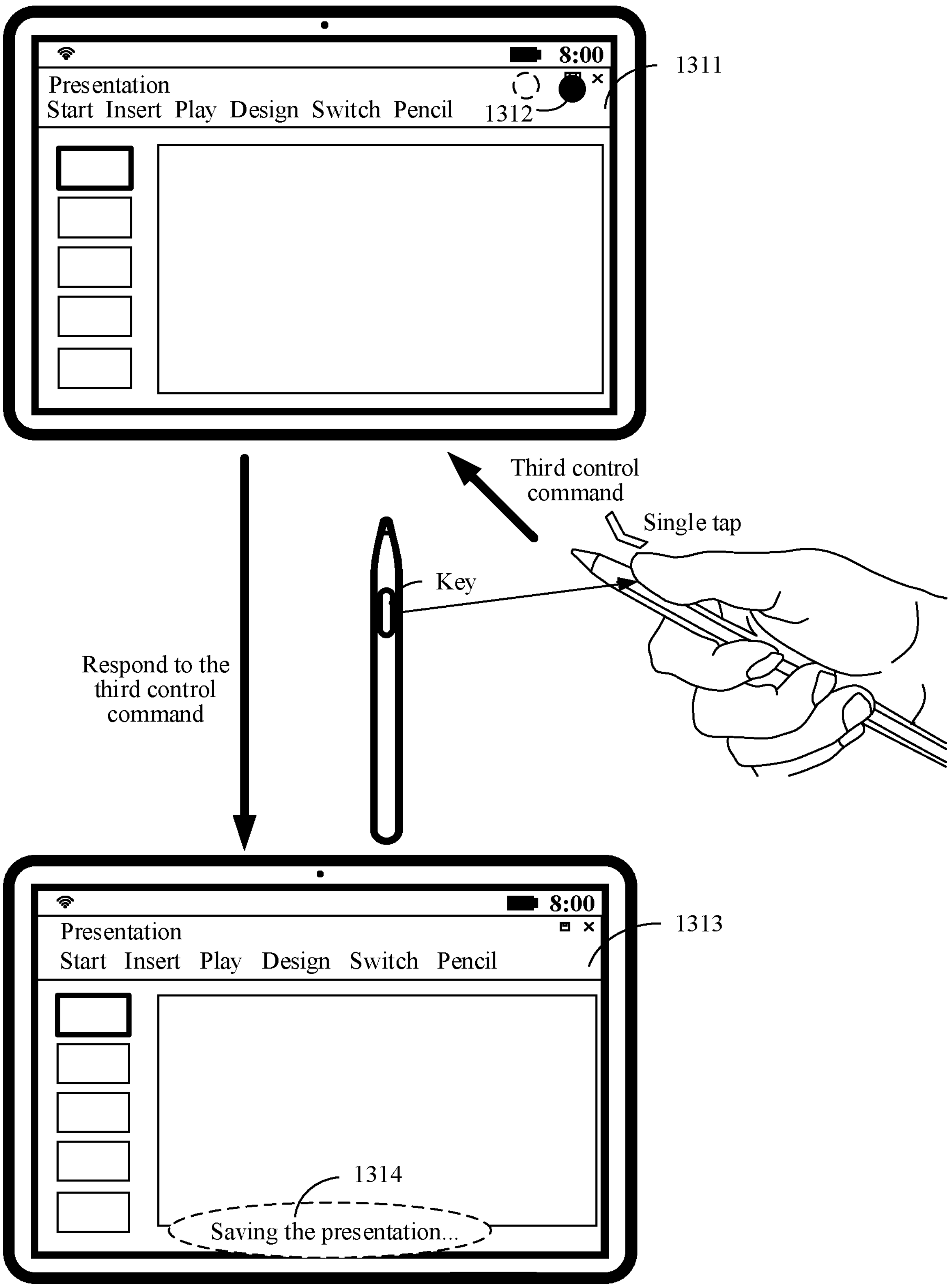
FIG. 13B is a second schematic diagram in which a stylus controls a first device to perform a tap operation according to an embodiment of this application.

For example, the first device is a tablet in FIG. 13B, the tablet may display an interface 1311, the interface 1311 includes a cursor 1312, and the cursor 1302 is located on a save button. In this case, when recognizing a double tap gesture, the stylus may send a third control command to the tablet. The tablet may display an interface 1313 in response to receiving the third control command, where the interface 1313 includes a prompt 1314, and the prompt 1314 prompts that a presentation is being saved. That is, the tablet performs a tap operation on the save button at a position of the cursor 1312 in response to receiving the third control command, so that the tablet starts to save the presentation.

It should be noted that in the examples in FIG. 13A and FIG. 13B, an example in which content (for example, the to-be-played video or the save button) that may respond to the tap operation is just located at the position of the cursor in the display interface of the first device is used for description. However, in actual implementation, content that may respond to the tap operation may not be displayed at the position of the cursor in the display interface of the first device. For example, the position of the cursor is a blank region without displaying any content. For another example, a picture, a text, or the like that cannot respond to the tap operation is displayed at the position of the cursor. For this case, there is no any response after the first device performs the tap operation on content displayed at the position of the cursor. That is, the tap operation is an invalid tap. For example, the cursor is displayed at a position of a dashed-line circle in the interface 1311 shown in FIG. 13B, where the position is close to the save button but does no cover the save button, and there is no any response after the first device performs the tap operation.

Presentation operation 4: page flipping operation. That is, the first device performs a page up operation (that is, flipping to a previous page) or a page down operation (that is, flipping to a next page).

In some embodiments, after switching the operating mode to the presentation mode, the stylus may control the first device to perform the page down operation based on a downward sliding gesture performed by the user on the stylus in a stylus body direction and control the first device to perform the page up operation based on an upward sliding gesture performed by the user on the stylus in the stylus body direction.

After switching the operating mode to the presentation mode, the stylus sends a fourth control command to the first device if detecting the downward sliding gesture performed by the user on the stylus in the stylus body direction, where the fourth control command is used for indicating and controlling the first device to perform the page down operation. The first device performs the page down operation in response to receiving the fourth control command.

Figure 14:
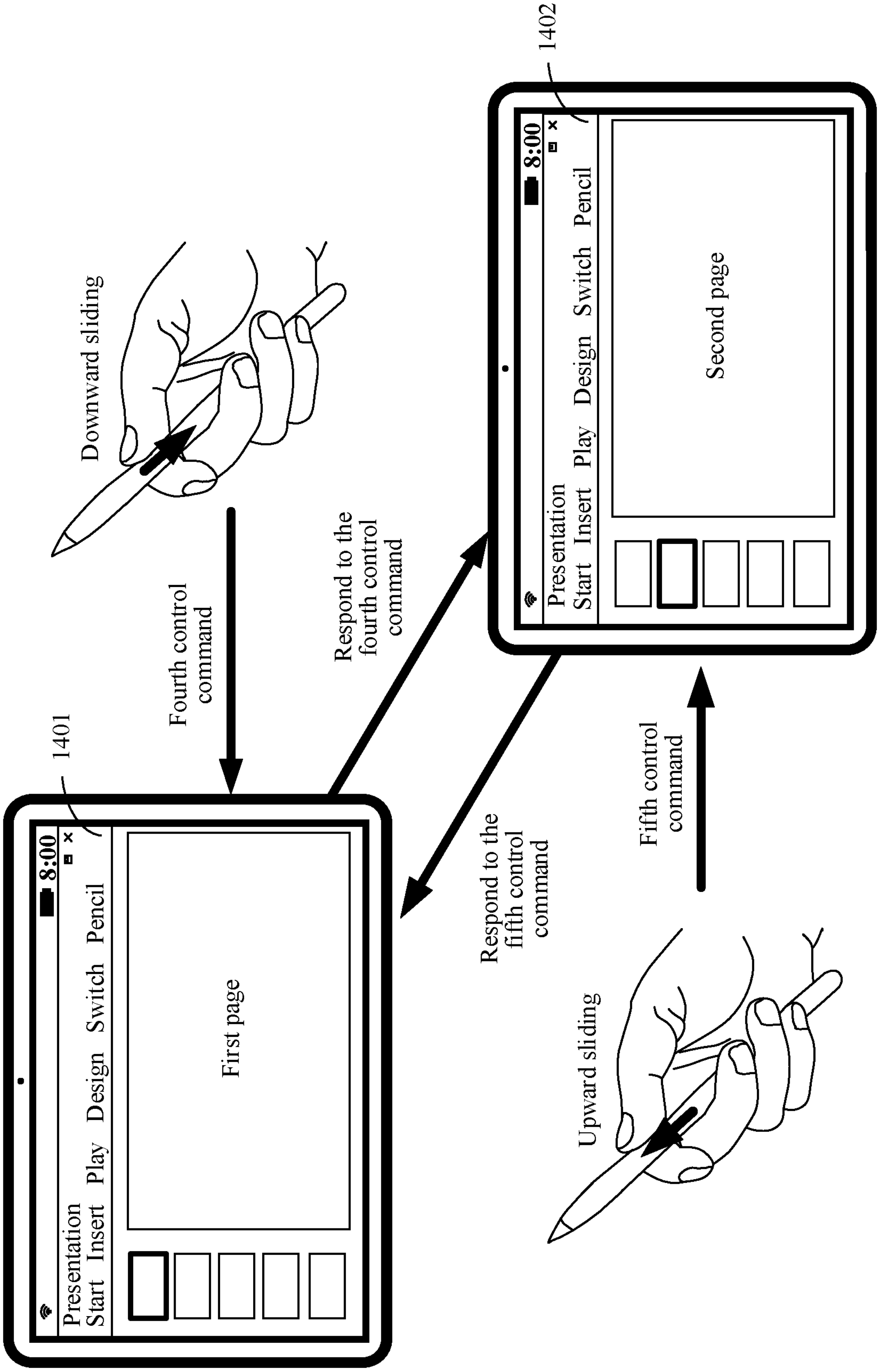
FIG. 14 is a schematic diagram in which a stylus controls a first device to perform a page flipping operation according to an embodiment of this application.

For example, the first device is a tablet in FIG. 14. The tablet may display an interface 1401, and the interface 1401 includes content of a first PPT. In a case that the stylus recognizes a downward sliding gesture performed by the user on the stylus along a stylus body, and the current operating mode of the stylus is the presentation mode, the stylus may send a fourth control command to the tablet. The tablet may display an interface 1402 in response to receiving the fourth control command, where the interface 1402 includes content of a second PPT, that is, flipping to a next page.

After switching the operating mode to the presentation mode, the stylus sends a fifth control command to the first device if detecting the upward sliding gesture performed by the user on the stylus in the stylus body direction, where the fifth control command is used for indicating and controlling the first device to perform the page up operation. The first device performs the page up operation in response to receiving the fifth control command.

For another example, the first device is a tablet in FIG. 14. The tablet may display an interface 1402, and the interface 1402 includes content of a second PPT. In a case that the stylus recognizes an upward sliding gesture performed by the user on the stylus along a stylus body, and the current operating mode of the stylus is the presentation mode, the stylus may send a fifth control command to the tablet. The tablet may display an interface 1401 in response to receiving the fifth control command, where the interface 1401 includes content of a first PPT, that is, flipping to a previous page.

In some other embodiments, after switching the operating mode to the presentation mode, the stylus may control the first device to perform the page down operation based on a thirteenth operation performed by the user on the key of the stylus and control the first device to perform the page up operation based on a fourteenth operation performed by the user on the key of the stylus. The thirteenth operation and the fourteenth operation each may be an operation such as long press, single tap, double tap, or three tap. In addition, the thirteenth operation and the fourteenth operation may be different operations on the same key, for example, the thirteenth operation is a double tap operation, and the fourteenth operation is a three tap operation. Alternatively, the thirteenth operation and the fourteenth operation may be the same operation on different keys, for example, the thirteenth operation is a single tap operation on a first key, and the fourteenth operation is a single tap operation on a second key.

In the foregoing embodiment of the process 2, an example in which a control command (for example, the first control command or the second control command) is used for indicating the first device to perform a corresponding presentation operation is mainly used for description. That is, the stylus determines a presentation operation that needs to be performed by the first device, and indicates, by using a control command, the first device to perform the presentation operation. That is, the control command carries information (for example, a name or a number) about the presentation operation. However, actual implementation is not limited thereto. In some other embodiments, the stylus may send at least one of information such as a gesture and an operation performed by the user on the stylus, a displacement of the stylus, and an orientation of the stylus to the first device by using the control command (for example, the first control command or the second control command). For example, after recognizing the third gesture, the stylus sends the first control command to the first device, where the first control command carries an identifier 01, and the identifier 01 is used for indicating the third gesture. Then, the first device determines and performs the corresponding presentation operation according to the control command (for example, the first control command or the second control command).

Process 3: Exit the presentation mode of the stylus. After exiting the presentation mode, the stylus cannot be configured for presentation control. That is, the stylus does not send the control command to the first device, and cannot control the first device to perform the presentation operations. Corresponding to enabling the presentation mode of the stylus, exiting the presentation mode of the stylus may be modifying the value of the flag bit to the first value.

A manner of exiting the presentation mode may include one or more of exiting the presentation mode by using the second device (which may be denoted as a manner 1), exiting the presentation mode by the stylus in response to a fifth gesture (a manner 2), exiting the presentation mode by the stylus in response to a fifteenth operation (a manner 3), exiting the presentation mode when the stylus is charged (a manner 4), and exiting the presentation mode by the stylus in response to a touch operation by using a tip (a manner 5). Specific implementations of the manner 1 to the manner 5 are described below in detail.

Manner 1: exiting the presentation mode by using the second device.

The manner 1 corresponds to the manner 1 in the foregoing process 1. A first control is provided in the second device, and the first control is configured to trigger switching of the operating mode of the stylus. The second device may receive a fifth operation performed by the user on the first control. The second device may send a second message to the stylus in response to the fifth operation, where the second message indicates the stylus to switch the operating mode. The stylus may switch the operating mode in response to receiving the second message. If the current operating mode of the stylus is the presentation mode, the stylus may switch the operating mode to the handwriting mode, to exit the presentation mode. For details, reference may be made to the descriptions of the manner 1 in the foregoing process 1. Details are not described herein again.

Manner 2: exiting the presentation mode by the stylus in response to a fifth gesture. The fifth gesture may be a gesture such as long press, single tap, double tap, or three tap. The fifth gesture and the first gesture may be the same or different. If the stylus recognizes the fifth gesture, and the stylus is currently in the presentation mode, the second device may switch the operating mode to the handwriting mode, to exit the presentation mode.

The fifth gesture may be a gesture performed on any position of the stylus and/or when the stylus is in any orientation. Alternatively, the fifth gesture may be a gesture performed on a fourth preset region of the stylus, and the fourth preset region may be the front end, the middle end, or the rear end of the stylus. In addition, the fourth preset region may be the same as or different from the first preset region. Alternatively, the fifth gesture may be a gesture performed when a tip of the stylus faces a preset direction, for example, faces upward or downward.

Manner 3: exiting the presentation mode by the stylus in response to a fifteenth gesture. The fifteenth operation may be specifically an operation such as long press, single tap, double tap, or three tap. The fifteenth operation may be the same as or different from the fourth operation.

In some embodiments, exiting of the presentation mode may also be triggered based on the fifteenth operation with reference to the moving trajectory of the stylus. For details, reference may be made to the descriptions of the manner 3 in the foregoing process 1. Details are not described herein again.

Manner 4: exiting the presentation mode when the stylus is charged.

Figure 2D:
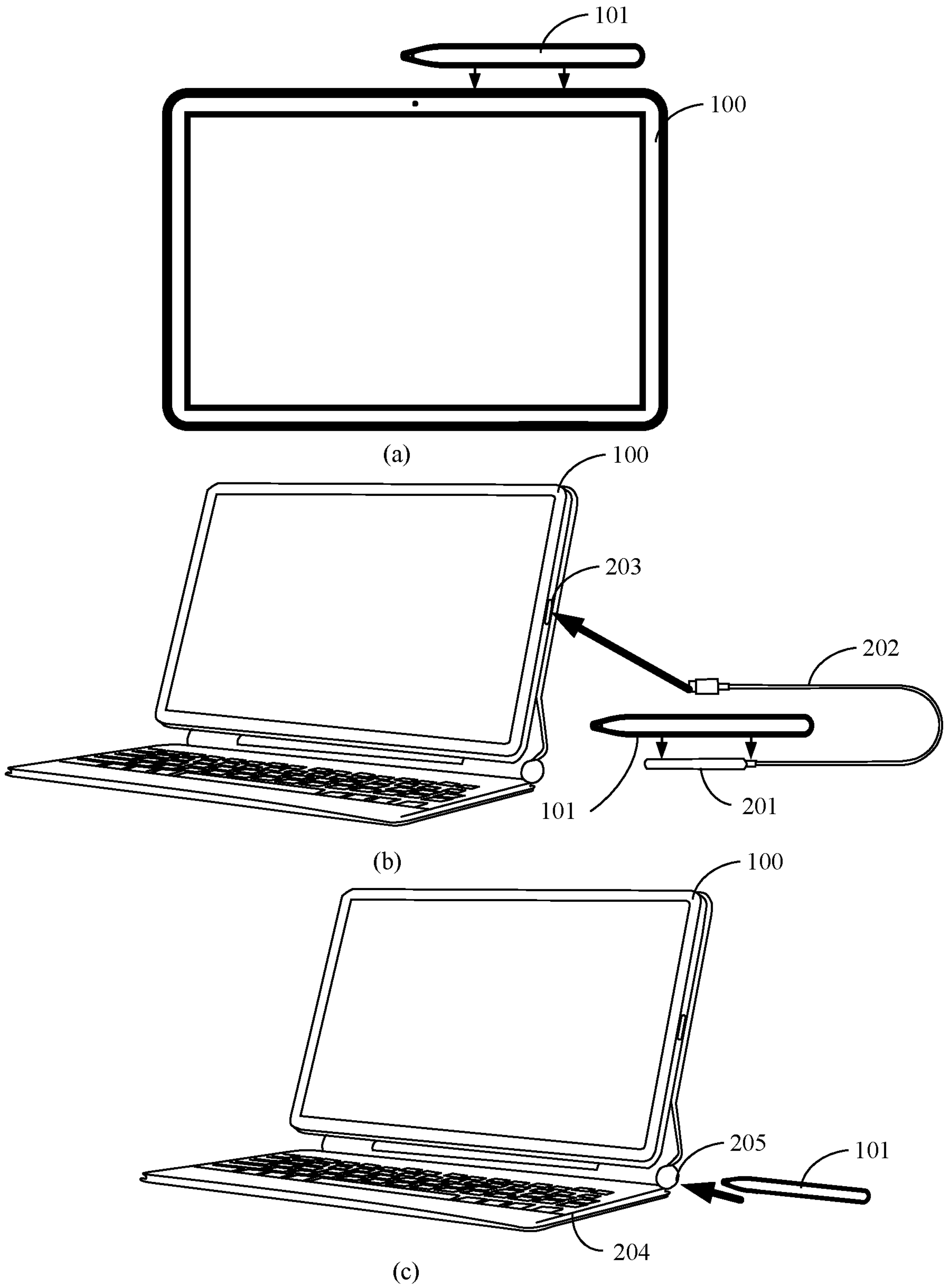
FIG. 2D is a schematic diagram of charging of a stylus according to an embodiment of this application.

For details, reference is made to the descriptions of (a) in FIG. 2D, (b) in FIG. 2D, and (c) in FIG. 2D. The stylus needs to be attached to the second device, or attached to the charging bar, or inserted into the accommodating hole for charging. Obviously, none of the charging scenarios is suitable for presentation control by using the stylus. Based on the foregoing, if the stylus detects a charging input, and the current operating mode of the stylus is the presentation mode, the stylus may switch the operating mode to the handwriting mode, to exit the presentation mode.

Figure 15:
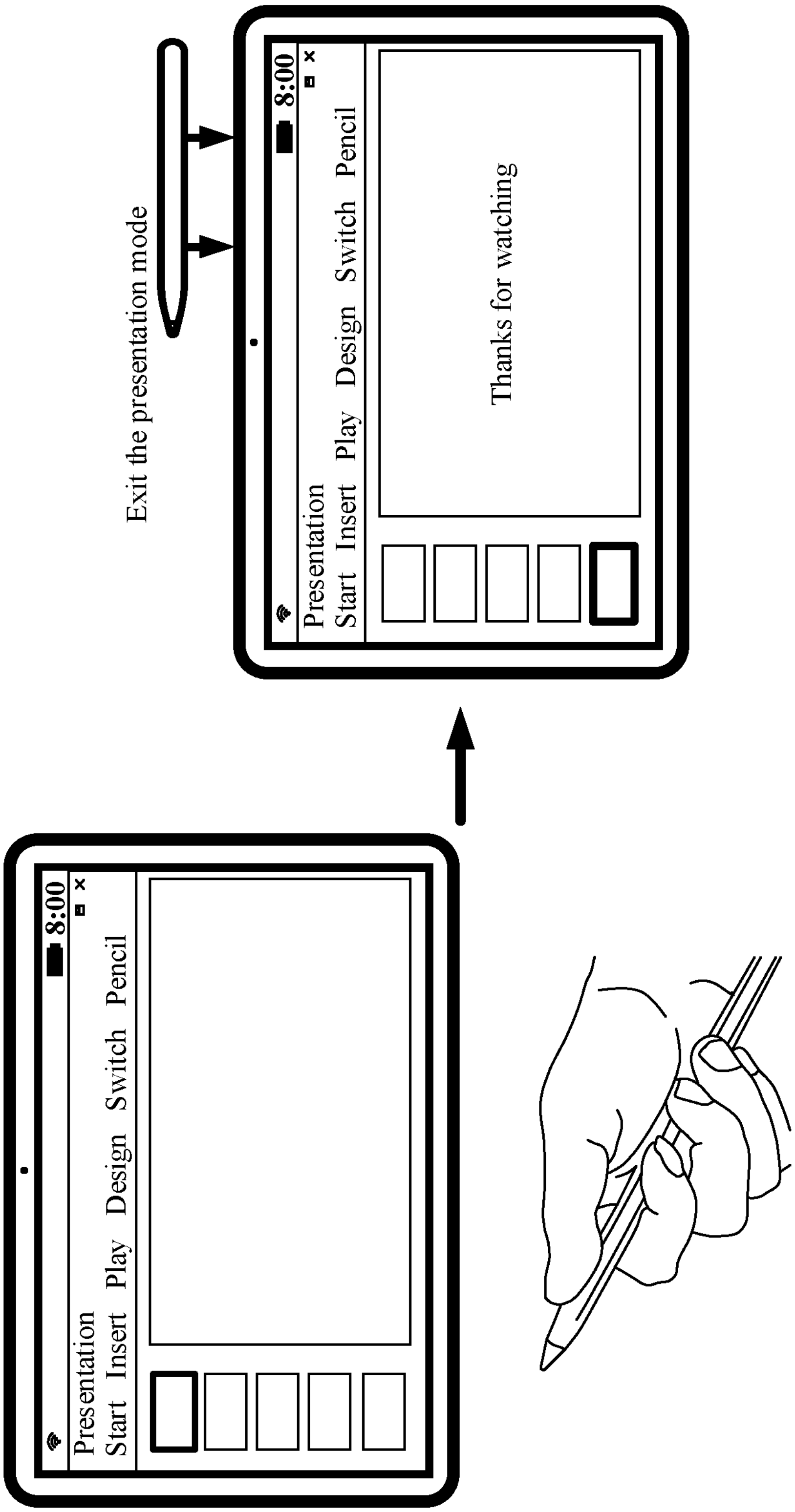
FIG. 15 is a first schematic diagram of exiting a presentation mode of a stylus according to an embodiment of this application.

For example, the second device is a tablet in FIG. 15. When using the stylus for presentation, the user holds the stylus. In this case, the stylus is usually not attached to the tablet. After the presentation ends, the user attaches the stylus to the tablet. In this case, the stylus detects a charging input and may switch the operating mode to the handwriting mode.

Manner 5: exiting the presentation mode by the stylus in response to a touch operation by using a tip.

The handwriting mode and the presentation mode of the stylus are mutually exclusive, that is, when being configured for touch, the stylus cannot be configured for presentation, and when being configured for presentation, the stylus cannot be configured for touch. Based on the foregoing, after the stylus switches the operating mode to the presentation mode, if the stylus detects that the tip of the stylus is in contact with the display interface of the second device, the stylus switches the operating mode to the handwriting mode. That is, after being configured for touch, the stylus exits the presentation mode, so that the stylus is no longer configured for presentation, avoiding conflict.

Figure 16:
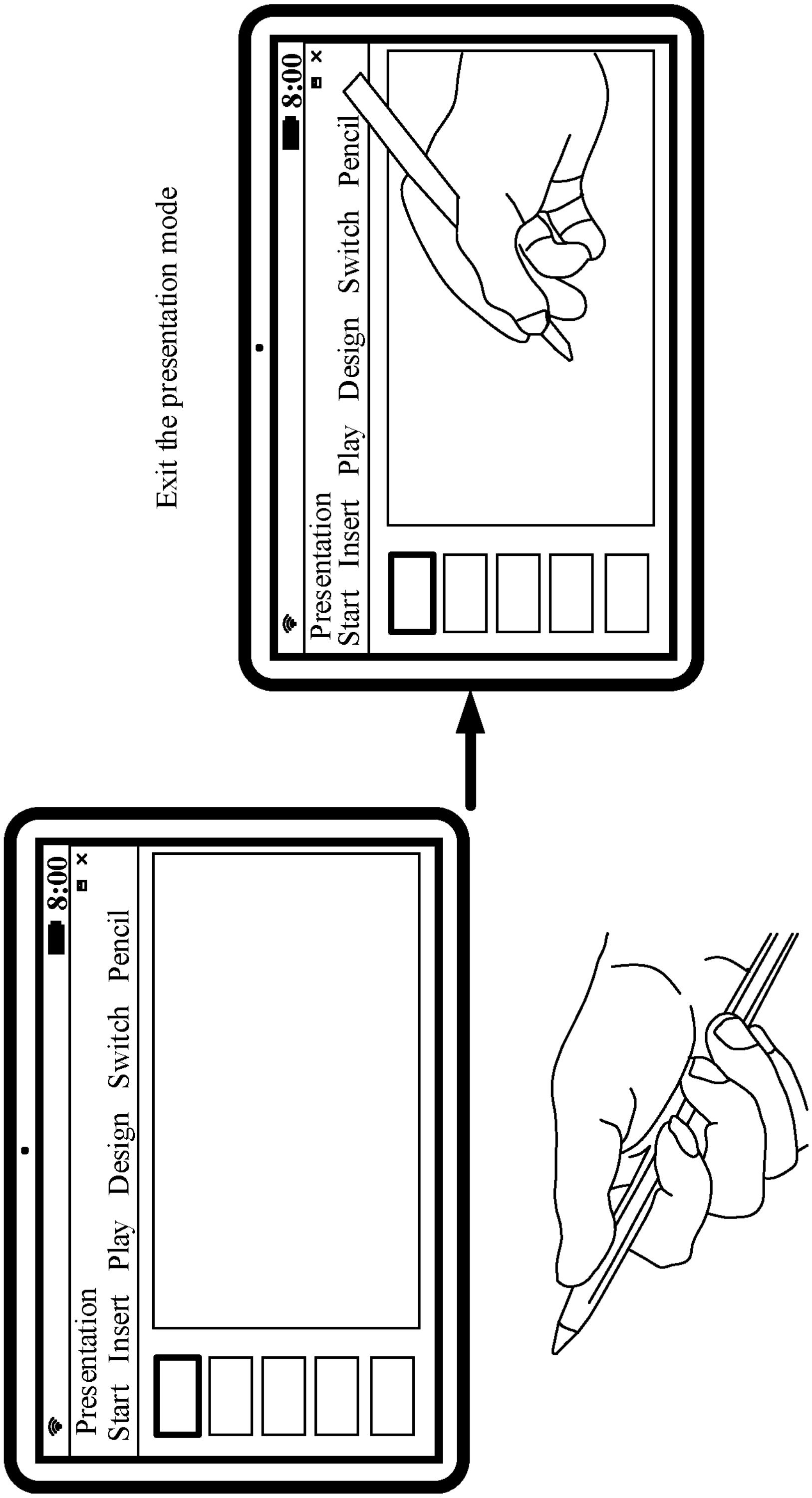
FIG. 16 is a second schematic diagram of exiting a presentation mode of a stylus according to an embodiment of this application.

For example, the second device is a tablet in FIG. 16. The user holds the stylus when the stylus is configured for presentation. In this case, the stylus does not touch a display interface of the tablet. After the tip of the stylus touches the display interface of the tablet, the stylus may switch the operating mode to the handwriting mode.

It should be noted that in the manner 5, an example in which after the presentation mode is enabled, the stylus exits the presentation mode when detecting the touch operation performed by the stylus on the second device is used for description. Actual implementation is not limited thereto. In some other embodiments, after the stylus switches the operating mode to the presentation mode, the second device may no longer respond to the touch operation performed by the stylus on the second device. Only after the presentation mode is exited, for example, after the presentation mode is exited in the manner 1 to the manner 4, the second device can respond to the touch operation performed by the stylus on the second device. In this way, conflict can also be avoided. Specifically, in the presentation mode, even if a distance between the stylus and the screen of the second device is less than a preset distance, that is, the first signal sent by the second device may cover the stylus, the stylus does not send the second signal and/or the third signal in response to the first signal. That is, in a case that the stylus is in the presentation mode, the second device cannot receive the second signal and/or the third signal and cannot respond to the touch operation performed by the stylus on the screen of the second device.

Figure 17:
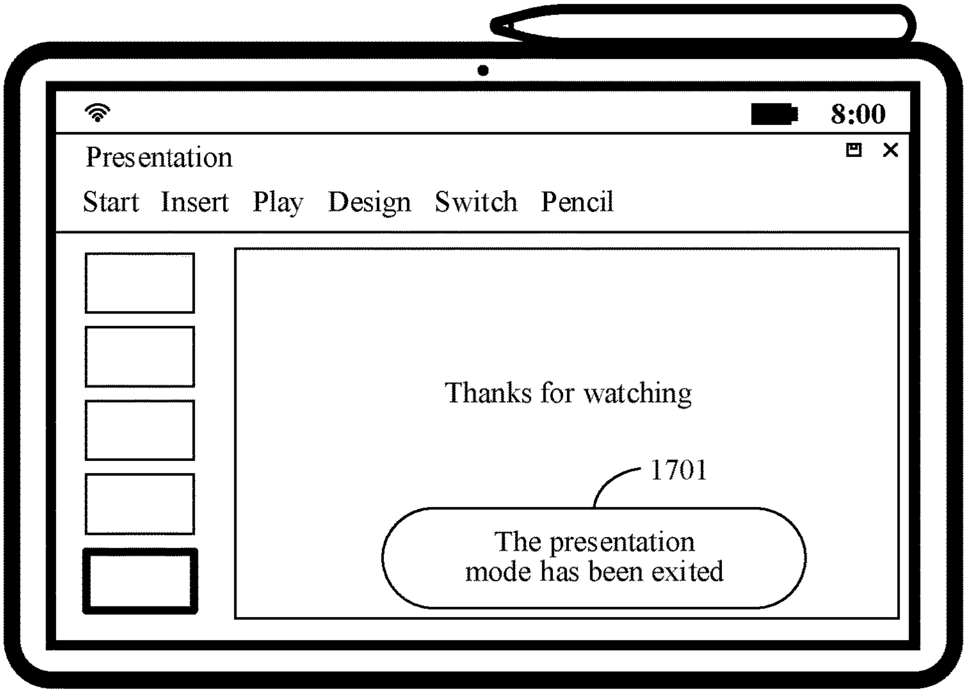
FIG. 17 is a third schematic diagram of exiting a presentation mode of a stylus according to an embodiment of this application.

After the presentation mode is exited in the manner 1 to the manner 5, the stylus, the first device, and/or the second device may send fourth prompt information, where the fourth prompt information is used for prompting that the presentation mode is exited. For example, after switching the operating mode to the handwriting mode, the stylus may send the fourth prompt information in the form of voice, vibration, or the like. For another example, after switching the operating mode to the handwriting mode, the stylus may send a fifth notification to the first device and/or the second device, where the fifth notification is used for notifying the first device and/or the second device of sending the fourth prompt information. The first device and/or the second device may send the fourth prompt information in the form of a pop-up window, voice, vibration, and/or the like in response to receiving the fifth notification. For example, the first device is a tablet in FIG. 17, the fourth prompt information may be a prompt 1701 displayed in the tablet, and the prompt 1001 includes "the presentation mode has been exited", to prompt that the presentation mode has been exited.

For ease of description, the event of triggering exiting of the presentation mode in the manner 1 to the manner 5 may be referred to as a second event. For example, the second event is that the stylus detects the fifth gesture, the fifteenth operation, or the like performed by the user on the stylus. For another example, the second event is that the second message from the second device is received.

So far, it should be noted that, the third gesture for controlling the first device to perform the cursor display operation and the fourth gesture for controlling the first device to perform the tap operation in the foregoing process 2, and the fifth gesture for triggering exiting of the presentation mode in the process 3 cannot be the same. For example, the third gesture is a long press gesture, the fourth gesture is a double tap gesture, and the fifth gesture is a three tap gesture. If at least two gestures of the third gesture, the fourth gesture, and the fifth gesture are the same, it may cause a response error.

Similarly, the eleventh operation for controlling the first device to perform the cursor display operation, the twelfth operation for controlling the first device to perform the tap operation, and the thirteenth operation and the fourteenth operation for controlling the first device to perform the page flipping operation in the foregoing process 2, and the fifteenth operation for triggering exiting of the presentation mode in the process 3 cannot be the same. For example, the eleventh operation is a long press operation, the twelfth operation is a single tap operation, the thirteenth operation is a double tap operation, the fourteenth operation is a three tap operation, and the fifteenth operation is a four tap operation. If at least two gestures of the eleventh operation, the twelfth operation, the thirteenth operation, the fourteenth operation, and the fifteenth operation are the same, it may cause a response error.

Figure 18A:
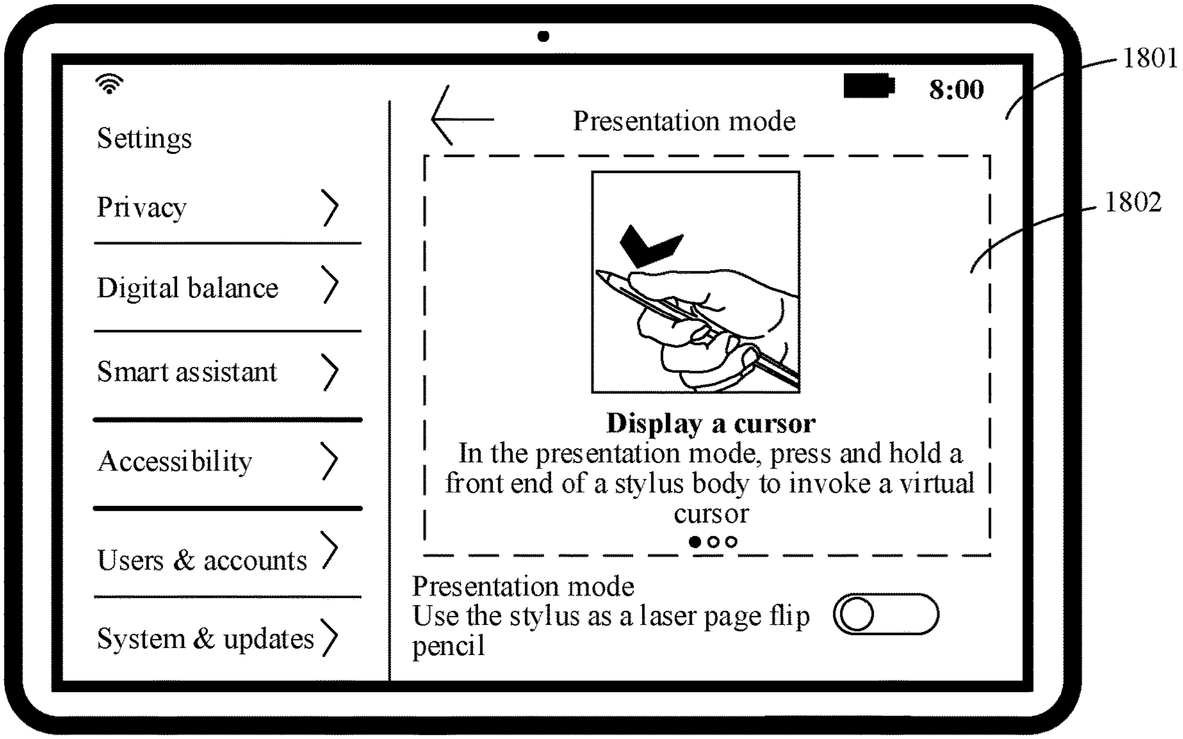
FIG. 18A is a first schematic diagram of an operation prompt in which a stylus is configured for presentation control according to an embodiment of this application.

To make it convenient for the user to learn the presentation mode, in some embodiments, Use introduction information of the presentation mode is displayed in the second device (for example, a setting page of the presentation mode), where the use introduction information includes an introduction to enabling the presentation mode, an introduction to controlling the first device to perform the presentation operation, and/or an introduction to exiting the presentation mode. For example, the second device is a tablet in FIG. 18A. The tablet may scroll and play an introduction (for example, "in the presentation mode, long press a front end of a stylus body to invoke a virtual cursor") to controlling the first device to perform the presentation operation (for example, cursor display) in a region 1802 in an interface 1801.

Figure 18B:
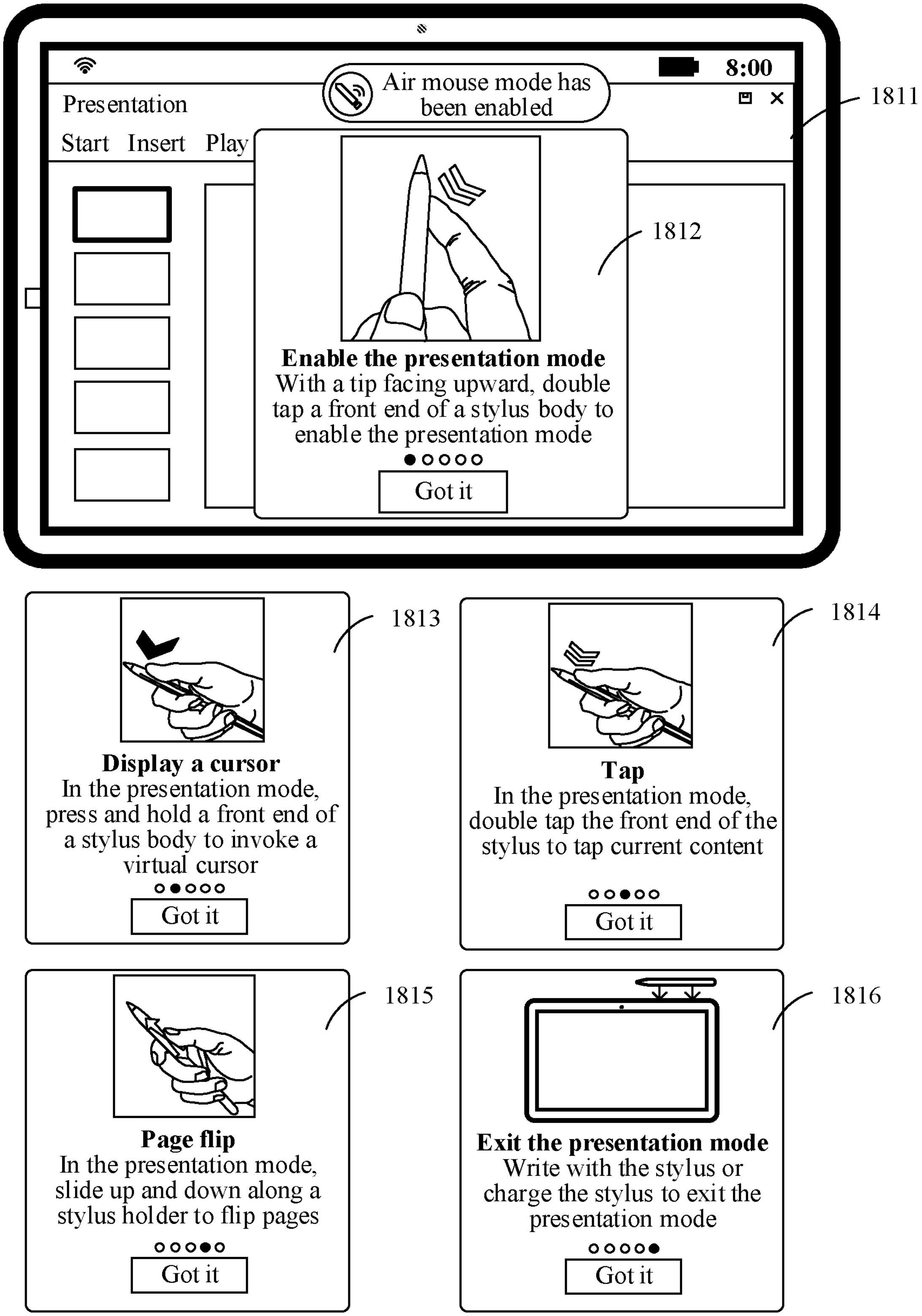
FIG. 18B is a second schematic diagram of an operation prompt in which a stylus is configured for presentation control according to an embodiment of this application.

In some other embodiments, after the presentation mode is first enabled, use introduction information of the presentation mode is displayed in the first device. The introduction information includes an introduction to enabling the presentation mode, an introduction to controlling the first device to perform the presentation operation, and/or an introduction to exiting the presentation mode. For example, the first device is a tablet in FIG. 18B. After the presentation mode is first enabled, the tablet may display an interface 1811, and may scroll and play an introduction to enabling the presentation mode (for example, an introduction 1812), an introduction to controlling the first device to perform the presentation operation (for example, an introduction 1813, an introduction 1814, and an introduction 1815), and an introduction to exiting the presentation mode (for example, an introduction 1816) in the interface 1811.

An embodiment of this application further provides a stylus. The stylus may include: a memory and one or more processors. The memory is coupled to the processor. The memory is configured to store computer program code, where the computer program code includes computer instructions. When the processor executes the computer instructions, the stylus may perform the functions or steps performed by the devices in the foregoing method embodiments.

Figure 19:
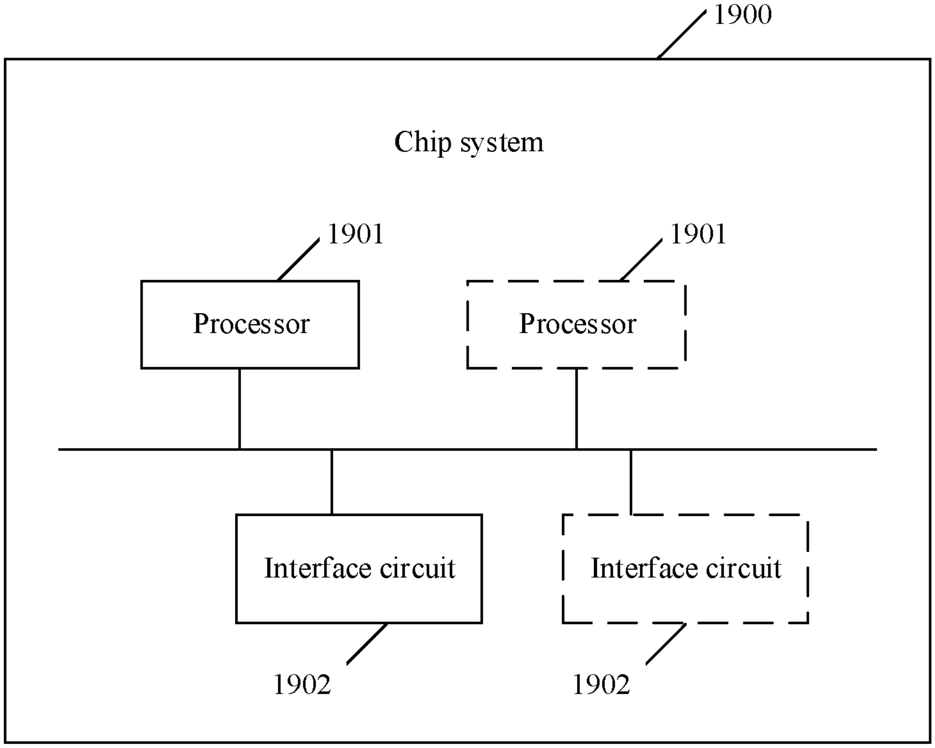
FIG. 19 is a schematic structural diagram of a chip system according to an embodiment of this application.

An embodiment of this application further provides a chip system. As shown in FIG. 19, the chip system 1900 includes at least one processor 1901 and at least one interface circuit 1902. The processor 1901 and the interface circuit 1902 may be interconnected through a line. For example, the interface circuit 1902 may be configured to receive a signal from another apparatus (for example, a memory of an electronic device). For another example, the interface circuit 1902 may be configured to send a signal to another apparatus (for example, the processor 1901). For example, the interface circuit 1902 may read instructions stored in the memory and send the instructions to the processor 1901. The instructions, when executed by the processor 1901, may cause the electronic device to perform the steps in the foregoing embodiments. Certainly, the chip system may further include other discrete devices. This is not specifically limited in this embodiment of this application.

This embodiment further provides a computer storage medium. The computer storage medium stores computer instructions. When the computer instructions run on a stylus, the stylus is enabled to perform the steps of the related method to implement the method in the foregoing embodiments.

This embodiment further provides a computer program product. When the computer program product runs on a computer, the computer is enabled to perform the foregoing related steps to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the method in the foregoing method embodiments.

The stylus, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely exemplary. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended to describe the technical solutions of this application, but are not intended to limit this application. Although this application is described in detail with reference to example embodiments, a person of ordinary skill in the art should understand that modification or equivalent replacement may be made to the technical solutions of this application without departing from the spirit and scope of the technical solutions of this application.

The invention claimed is:

1. A method, comprising:

displaying a first interface that comprises a first prompt information, wherein the first prompt information comprises introduction information of presentation operation, and the presentation operation comprises at least one of a displaying cursor operation and a moving cursor operation;

receiving a first control information from a stylus, and displaying a cursor at a first position of a display interface, wherein the first control information is in response to the stylus being long pressed;

receiving a second control information from the stylus, and displaying, on the display interface, the cursor being moved from the first position to a second position, wherein the second control information is in response to the stylus being long pressed and moved;

receiving a third control information from the stylus, and not displaying the cursor at the second position of the display interface, wherein the third control information is in response to the stylus stopping being long pressed; and receiving a fourth control information from the stylus, after the cursor is not displayed at the second position of the display interface, and displaying the cursor at the second position of the display interface, wherein the fourth control information is in response to the stylus being long pressed.

2. The method of claim 1, wherein content displayed is projected to a screen projected device.

3. The method of claim 1, wherein either:

the displaying cursor operation comprises long pressing on a front end of the stylus, and the first control information is in response to the front end of the stylus being long pressed; or the displaying cursor operation comprises long pressing on a first key of the stylus, the first control information is in response to the first key being long pressed.

4. The method of claim 1, wherein the presentation operation further comprises a page flipping operation, and wherein the method further comprises:

displaying, by an electronic device, a first page of a presentation;

receiving, by the electronic device, a fifth control information sent by the stylus, after displaying the first page, and displaying a second page of the presentation, wherein the fifth control information is in response to a first operation being performed on the stylus; and receiving, by the electronic device, a sixth control information sent by the stylus, after displaying the second page, and displaying the first page of the presentation, wherein the sixth control information is in response to a second operation being performed on the stylus.

5. The method of claim 4, wherein the first operation comprises a sliding operation along the stylus in a first direction, the fifth control information is in response to the sliding operation being performed on the stylus in the first direction, the second operation comprises a sliding operation along the stylus in a second direction, and the sixth control information is in response to the sliding operation being performed on the stylus in the second direction.

6. The method of claim 4, wherein the first operation and the second operation are the same operation on different keys of the stylus.

7. The method of claim 1, wherein before receiving the first control information, the method further comprises establishing a Bluetooth connection with the stylus, wherein the first control information, the second control information, the third control information, and the fourth control information are received via the Bluetooth connection.

8. The method of claim 7, further comprising:

sending, by an electronic device, a first signal; and receiving a second signal from the stylus when a distance between a tip of the stylus and a screen of the electronic device is less than a preset distance, wherein the first signal and the second signal comprise square wave signals, or the first signal and the second signal comprise baseband signals.

9. The method of claim 1, wherein not displaying the cursor at the second position of the display interface comprises not displaying the cursor at the second position of the display interface after a preset length of time from receiving the third control information, wherein the cursor is still displayed within the preset length of time from receiving the third control information.

10. The method of claim 9, further comprising:

receiving a seventh control information; and performing a tap operation on content corresponding a position of the cursor within the preset length of time from receiving the third control information.

11. A system for presentation control, comprising:

a stylus; and an electronic device coupled to the stylus via Bluetooth, wherein the electronic device is configured to:

display a first interface that comprises a first control and a first prompt information, wherein the first prompt information comprises introduction information of presentation operation, and the presentation operation comprises at least one of a displaying cursor operation and a moving cursor operation;

wherein the stylus is configured to send a first control information in response to the stylus is being long pressed and, wherein after receiving the first control information, the electronic device is further configured to display a cursor at a first position of a display interface, wherein the stylus is further configured to send a second control information in response to the stylus being moved when the stylus is being long pressed, wherein after receiving the second control information, the electronic device is further configured to display the cursor being moved from the first position to a second position on the display interface, wherein the stylus is further configured to send a third control information after the stylus has stopped being long pressed, wherein after receiving the third control information, the electronic device is further configured to not display the cursor at the second position of the display interface, wherein the stylus is further configured to send a fourth control information in response to the stylus being long pressed, and wherein after receiving the fourth control information, the electronic device is further configured to display the cursor at the first-second position of the display interface.

12. An electronic device, comprising:

one or more processors; and a memory coupled to the one or more processors and configured to store instructions that, when executed by the one or more processors, cause the electronic device to be configured to:

display a first interface that comprises a first prompt information, wherein the first prompt information comprises introduction information of presentation operation, and the presentation operation comprises at least one of a displaying cursor operation and a moving cursor operation;

receive a first control information from a stylus, and display a cursor at a first position of a display interface, wherein the first control information is in response to the stylus being long pressed;

receive a second control information from the stylus, and display, on the display interface, the cursor being moved from the first position to a second position, wherein the second control information is in response to the stylus being long pressed and moved;

receive a third control information from the stylus, and not display the cursor at the second position of the display interface, wherein the third control information is in response to the stylus stopping being long pressed; and receive a fourth control information from the stylus, after the cursor is not displayed at the second position of the display interface, and display the cursor at the first second position of the display interface, wherein the fourth control information is in response to the stylus being long pressed.

13. The electronic device of claim 12, wherein content displayed is projected to a screen projected device.

14. The electronic device of claim 12, wherein either:

the displaying cursor operation comprises long pressing on a front end of the stylus, and the first control information is in response to the front end of the stylus being long pressed; or the displaying cursor operation comprises long pressing on a first key of the stylus, the first control information is in response to the first key being long pressed.

15. The electronic device of claim 12, wherein the presentation operation further comprises a page flipping operation, and the instructions, when executed by the one or more processors, further cause the electronic device to be configured to:

display a first page of a presentation;

receive a fifth control information sent by the stylus, after displaying the first page, and display a second page of the presentation, wherein the fifth control information is in response to a first operation being performed on the stylus; and receive a sixth control information sent by the stylus, after displaying the second page, and display the first page of the presentation, wherein the sixth control information is in response to a second operation being performed on the stylus.

16. The electronic device of claim 15, wherein the first operation comprises a sliding operation along the stylus in a first direction, the fifth control information is in response to the sliding operation being performed on the stylus in the first direction, the second operation comprises a sliding operation along the stylus in a second direction, and the sixth control information is in response to the sliding operation being performed on the stylus in the second direction.

17. The electronic device of claim 15, wherein the first operation and the second operation are the same operation on different keys of the stylus.

18. The electronic device of claim 12, wherein before receiving the first control information, the instructions, when executed by the one or more processors, further cause the electronic device to be configured to establish a Bluetooth connection with the stylus, wherein the first control information, the second control information, the third control information, and the fourth control information are received by the electronic device via the Bluetooth connection.

19. The electronic device of claim 18, wherein the instructions, when executed by the one or more processors, further cause the electronic device to be configured to:

send a first signal; and receive a second signal from the stylus when a distance between a tip of the stylus and a screen of the electronic device is less than a preset distance, wherein the first signal and the second signal comprise square wave signals, or the first signal and the second signal comprise baseband signals.

20. The electronic device of claim 12, wherein not displaying the cursor at the second position of the display interface comprises not displaying the cursor at the second position of the display interface after a preset length of time from receiving the third control information, wherein the cursor is still displayed within the preset length of time from receiving the third control information.

* * * * *